(12) United States Patent
Matsuda

(10) Patent No.: US 12,088,412 B2
(45) Date of Patent: Sep. 10, 2024

(54) COMMUNICATION DEVICE AND COMMUNICATION METHOD

(71) Applicant: Sony Group Corporation, Tokyo (JP)

(72) Inventor: Hiroki Matsuda, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 36 days.

(21) Appl. No.: 17/798,888

(22) PCT Filed: Feb. 16, 2021

(86) PCT No.: PCT/JP2021/005599
§ 371 (c)(1),
(2) Date: Aug. 11, 2022

(87) PCT Pub. No.: WO2021/192731
PCT Pub. Date: Sep. 30, 2021

(65) Prior Publication Data
US 2023/0093112 A1 Mar. 23, 2023

(30) Foreign Application Priority Data
Mar. 23, 2020 (JP) .................... 2020-051750

(51) Int. Cl.
*H04L 1/00* (2006.01)
(52) U.S. Cl.
CPC .......... *H04L 1/0072* (2013.01); *H04L 1/0057* (2013.01)
(58) Field of Classification Search
CPC .................................................. H04L 1/0072
See application file for complete search history.

(56) References Cited

U.S. PATENT DOCUMENTS

| | | | | |
|---|---|---|---|---|
| 5,309,450 A | * | 5/1994 | Kim ..................... | H04N 5/9264 |
| | | | | 714/701 |
| 9,178,659 B2 | * | 11/2015 | Gaddam ............... | H04L 1/0065 |
| 9,954,635 B2 | * | 4/2018 | Ferguson ........... | G11B 20/1833 |
| 11,050,514 B1 | * | 6/2021 | Haraden ............... | H04L 1/0041 |

(Continued)

FOREIGN PATENT DOCUMENTS

| | | |
|---|---|---|
| JP | 2008-228285 A | 9/2008 |
| JP | 2015-228647 A | 12/2015 |

(Continued)

OTHER PUBLICATIONS

International Search Report and Written Opinion mailed on May 11, 2021, received for PCT Application PCT/JP2021/005599, filed on Feb. 16, 2021, 14 pages including English Translation.

(Continued)

*Primary Examiner* — Joseph D Torres
(74) *Attorney, Agent, or Firm* — XSENSUS LLP

(57) ABSTRACT

A communication device includes a redundant data generation unit, a signal generation unit, and a transmission unit. The redundant data generation unit performs error correction coding processing on combined data obtained by combining first data and second data to generate redundant data used for error correction. The signal generation unit generates a transmission signal based on the second data and the redundant data. The transmission unit transmits the transmission signal to another communication device.

15 Claims, 20 Drawing Sheets

(56) References Cited

U.S. PATENT DOCUMENTS

| | | | | |
|---|---|---|---|---|
| 2007/0105508 | A1* | 5/2007 | Tong | H04L 1/0625 455/562.1 |
| 2008/0159251 | A1* | 7/2008 | Shiokawa | H04W 72/542 370/344 |
| 2009/0006925 | A1 | 1/2009 | Pan | |
| 2010/0005351 | A1* | 1/2010 | Ahn | H04L 1/1887 714/748 |
| 2010/0077276 | A1* | 3/2010 | Okamura | H04L 1/1812 714/752 |
| 2011/0197106 | A1* | 8/2011 | Kishigami | H03M 13/293 714/755 |
| 2014/0314157 | A1* | 10/2014 | Hwang | H04N 19/89 375/240.27 |
| 2015/0135041 | A1* | 5/2015 | O'Connell | H04L 1/0041 714/776 |
| 2015/0256291 | A1 | 9/2015 | Shin et al. | |
| 2015/0334004 | A1* | 11/2015 | Hussain | H04J 14/0291 398/5 |
| 2016/0134392 | A1* | 5/2016 | Effenberger | H04L 1/0057 714/776 |
| 2017/0041100 | A1 | 2/2017 | Xie | |
| 2019/0260623 | A1 | 8/2019 | Chao | |
| 2022/0029638 | A1* | 1/2022 | Kim | H04L 1/00 |

FOREIGN PATENT DOCUMENTS

| | | |
|---|---|---|
| JP | 2016-504861 A | 2/2016 |
| WO | 2006/006233 A1 | 1/2006 |
| WO | 2006/075417 A1 | 7/2006 |
| WO | 2008/041309 A1 | 4/2008 |
| WO | 2012/086141 A1 | 6/2012 |
| WO | WO-2018009572 A1 | 1/2018 |

OTHER PUBLICATIONS

3GPP, "NR; Multiplexing and channel coding (Release 15)", 3GPP TS 38.212 V15.7.0, Sep. 2019, pp. 1-101.

* cited by examiner

FIG.3

| $H_{BG}$ | | $V_{i,j}$ | | | | | | | |
|---|---|---|---|---|---|---|---|---|---|
| Row index $i$ | Column index $j$ | Set index $i_{LS}$ | | | | | | | |
| | | 0 | 1 | 2 | 3 | 4 | 5 | 6 | 7 |
| 0 | 0 | 250 | 307 | 73 | 223 | 211 | 294 | 0 | 135 |
| | 1 | 69 | 19 | 15 | 16 | 198 | 118 | 0 | 227 |
| | 2 | 226 | 50 | 103 | 94 | 188 | 167 | 0 | 126 |
| | 3 | 159 | 369 | 49 | 91 | 186 | 330 | 0 | 134 |
| | 5 | 100 | 181 | 240 | 74 | 219 | 207 | 0 | 84 |
| | 6 | 10 | 216 | 39 | 10 | 4 | 165 | 0 | 83 |
| | 9 | 59 | 317 | 15 | 0 | 29 | 243 | 0 | 53 |
| | 10 | 229 | 288 | 162 | 205 | 144 | 250 | 0 | 225 |
| | 11 | 110 | 109 | 215 | 216 | 116 | 1 | 0 | 205 |
| | 12 | 191 | 17 | 164 | 21 | 216 | 339 | 0 | 128 |
| | 13 | 9 | 357 | 133 | 215 | 115 | 201 | 0 | 75 |
| | 15 | 195 | 215 | 298 | 14 | 233 | 53 | 0 | 135 |
| | 16 | 23 | 106 | 110 | 70 | 144 | 347 | 0 | 217 |
| | 18 | 190 | 242 | 113 | 141 | 95 | 304 | 0 | 220 |
| | 19 | 35 | 180 | 16 | 198 | 216 | 167 | 0 | 90 |
| | 20 | 239 | 330 | 189 | 104 | 73 | 47 | 0 | 105 |
| | 21 | 31 | 346 | 32 | 81 | 261 | 188 | 0 | 137 |
| | 22 | 1 | 1 | 1 | 1 | 1 | 1 | 0 | 1 |
| | 23 | 0 | 0 | 0 | 0 | 0 | 0 | 0 | 0 |

→ 1st transmission
----→ 2nd transmission
———→ 3rd transmission
——---→ 4th transmission

----→ WRITE DIRECTION
———→ READ DIRECTION

FIG.18
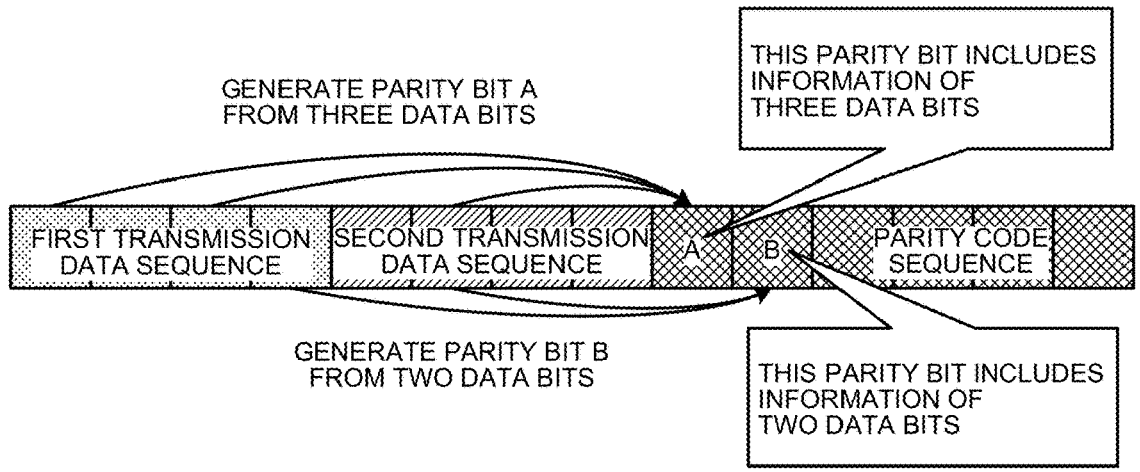
FIG.19
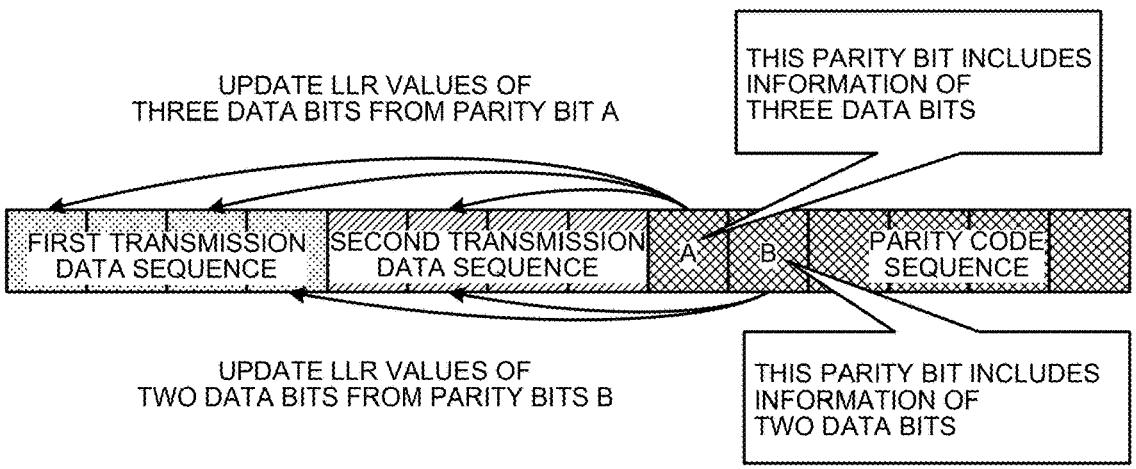
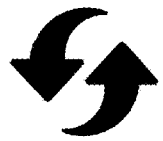
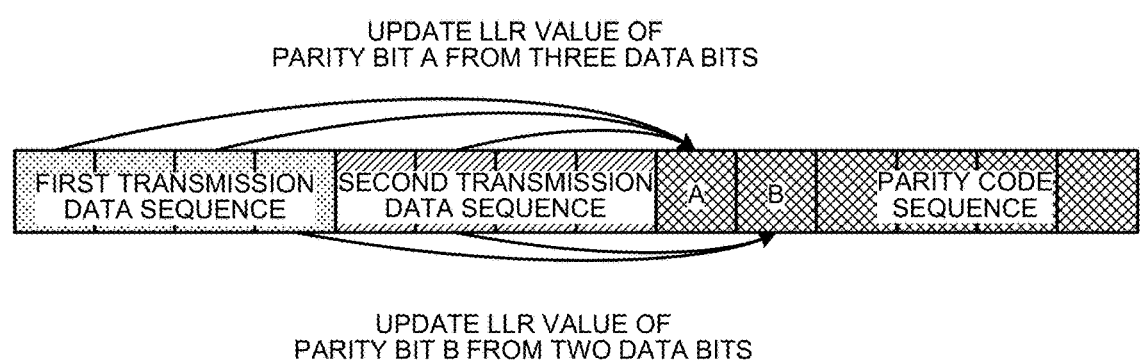

FIG.21A

The input bit sequence 1 is denoted by $\hat{b}_0, \hat{b}_1, \hat{b}_2, \hat{b}_3, ..., \hat{b}_{B_1-1}$, and The input bit sequence 2 is denoted by $\tilde{b}_0, \tilde{b}_1, \tilde{b}_2, \tilde{b}_3, ..., \tilde{b}_{B_2-1}$, where $B_1 > 0$ and $B_2 > 0$. The combined bit sequence to the code block segmentation is denoted by $b_0, b_1, b_2, b_3, ..., b_{B-1}, = \hat{b}_0, \hat{b}_1, \hat{b}_2, \hat{b}_3, ..., \hat{b}_{B_1-1}, \tilde{b}_0, \tilde{b}_1, \tilde{b}_2, \tilde{b}_3, ..., \tilde{b}_{B_2-1}$, where $B = B_1 + B_2$. If $B$ is larger than the maximum code block size $K_{cb}$, segmentation of the input bit sequence is performed and an additional CRC sequence of $L = 24$ bits is attached to each code block.
For LDPC base graph 1, the maximum code block size is:
  - $K_{cb} = 8448$.

For LDPC base graph 2, the maximum code block size is:
  - $K_{cb} = 3840$.

Total number of code blocks $C$ is determined by:
if $B \leq K_{cb}$
$$L = 0$$
  Number of code blocks: $C = 1$
$$B' = B$$
else
$$L = 24$$
  Number of code blocks: $C = \lceil B/(K_{cb} - L) \rceil$.
$$B' = B + C \cdot L$$
end if

FIG.21B

The bits output from code block segmentation are denoted by $c_{r0}, c_{r1}, c_{r2}, c_{r3}, \ldots, c_{r(K_r-1)}$, where $0 \leq r < C$ is the code block number, and $K_r = K$ is the number of bits for the code block number.

The number of bits $K$ in each code block is calculated as:

$K' = B'/C$;

For LDPC base graph 1, $K_b = 22$.

For LDPC base graph 2, if $B > 640$ $K_b = 10$;

elseif $B > 560$ $K_b = 9$;

elseif $B > 192$ $K_b = 8$;

else $K_b = 6$;

end if find the minimum value of $Z$ in all sets of lifting sizes in Table 5. 3. 2-1, denoted as $Z_c$, such that $K_b \cdot Z_c \geq K'$, and set $K = 22Z_c$ for LDPC base graph 1 and $K = 10Z_c$ for LDPC base graph 2;

FIG.21C

The bit sequence $c_{rk}$ is calculated as:
   $s = 0$;

for $r = 0$ to $C - 1$ for $k = 0$ to $K' - L - 1$ $c_{rk} = b_s$;

$s = s + 1$;

end for if $C > 1$

The sequence $c_{r0}, c_{r1}, c_{r2}, c_{r3}, ..., c_{r(K'-L-1)}$ is used to calculate the CRC parity bits $p_{r0}, p_{r1}, p_{r2}, p_{r3}, ..., p_{r(L-1)}$ according to Subclause 5.1 with the generator polynomial $g_{CRC24B}(D)$.

for $k = K' - L$ to $K' - 1$ $c_{rk} = p_{r(k+L-K')}$;

end for end if for $k = K'$ to $K - 1$ -- Insertion of filler bits $c_{rk} = <NULL>$;

end for end for

FIG.21D

The bit sequence input for a given code block to channel coding is denoted by $c_0, c_1, c_2, c_3, \ldots, c_{K-1}$, where $K$ is the number of bits to encode as defined in Subclause 5. 2. 2. After encoding the bits are denoted by $d_0, d_1, d_2, \ldots, d_{N-1}$, where $N = 66Z_c$ for LDPC base graph 1 and $N = 50Z_c$ for LDPC base graph 2, and the value of $Z_c$ is given in Subclause 5. 2. 2.
For a code block encoded by LDPC, the following encoding procedure applies:

1) Find the set with index $i_{LS}$ in Table 5. 3. 2-1 which contains $Z_c$.

2) for $k = S_{init}$ to $K - 1$, where if $2Z_c \leq B_1$, $S_{init} = B_1$, otherwise, $S_{init} = 2Z_c$ if $c_k \neq$ <NULL>

$d_{k-S_{init}} = c_k$;

else $c_k = 0$;

$d_{k-S_{init}} =$ <NULL>;

end if end for

3) Generate $N + 2Z_c - K$ parity bits $\mathbf{w} = [w_0, w_1, w_2, \ldots, w_{N+2Z_c-K-1}]^T$ such that $H \times \begin{bmatrix} \mathbf{c} \\ \mathbf{w} \end{bmatrix} = 0$, where $\mathbf{c} = [c_0, c_1, c_2, \ldots, c_{K-1}]^T$; $\mathbf{0}$ is a column vector of all elements equal to 0. The encoding is performed in GF(2).

For LDPC base graph 1, a matrix of $H_{BG}$ has 46 rows with row indices $i = 0, 1, 2, \ldots, 45$ and 68 columns with column indices $j = 0, 1, 2, \ldots, 67$. For LDPC base graph 2, a matrix of $H_{BG}$ has 42 rows with row indices $i = 0, 1, 2, \ldots, 41$ and 52 columns with column indices $j = 0, 1, 2, \ldots, 51$. The elements in $H_{BG}$ with row and column indices given in Table 5. 3. 2-2 (for LDPC base graph 1) and Table 5. 3. 2-3 (for LDPC base graph 2) are of value 1, and all other elements in $H_{BG}$ are of value 0.

The matrix $H$ is obtained by replacing each element of $H_{BG}$ with a $Z_c \times Z_c$ matrix, according to the following:

- Each element of value 0 in $H_{BG}$ is replaced by an all zero matrix $\mathbf{0}$ of size $Z_c \times Z_c$;

- Each element of value 1 in $H_{BG}$ is replaced by a circular permutation matrix $I(P_{i,j})$ of size $Z_c \times Z_c$, where $i$ and $j$ are the row and column indices of the element, and $I(P_{i,j})$ is obtained by circularly shifting the identity matrix $I$ of size $Z_c \times Z_c$ to the right $P_{i,j}$ times. The value of $P_{i,j}$ is given by $P_{i,j} = mod(V_{i,j}, Z_c)$. The value of $V_{i,j}$ is given by Tables 5. 3. 2-2 and 5. 3. 2-3 according to the set index $i_{LS}$ and LDPC base graph.

4) for $k = K$ to $N + 2Z_c - 1$ $d_{k-S_{init}} = w_{k-K}$;

end for

FIG.22

| Set index ($i_{LS}$) | Set of lifting sizes ($Z$) |
|---|---|
| 0 | {2, 4, 8, 16, 32, 64, 128, 256} |
| 1 | {3, 6, 12, 24, 48, 96, 192, 384} |
| 2 | {5, 10, 20, 40, 80, 160, 320} |
| 3 | {7, 14, 28, 56, 112, 224} |
| 4 | {9, 18, 36, 72, 144, 288} |
| 5 | {11, 22, 44, 88, 176, 352} |
| 6 | {13, 26, 52, 104, 208} |
| 7 | {15, 30, 60, 120, 240} |

COMMUNICATION DEVICE AND COMMUNICATION METHOD

CROSS-REFERENCE TO RELATED APPLICATIONS

The present application is based on PCT filing PCT/JP2021/005599, filed Feb. 16, 2021, which claims priority to Japanese Patent Application No. 2020-051750, filed Mar. 23, 2020, the entire contents of each are incorporated herein by reference.

FIELD

The present disclosure relates to a communication device and a communication method.

BACKGROUND

A radio access scheme and wireless network of cellular mobile communication (hereinafter, also referred to as "Long Term Evolution (LTE)", "LTE-Advanced (LTE-A)", "LTE-Advanced Pro (LTE-A Pro)", "New Radio (NR)", "New Radio Access Technology (NRAT)", "Evolved Universal Terrestrial Radio Access (EUTRA)", or "Further EUTRA (FEUTRA)") has been studied in 3rd Generation Partnership Project (3GPP). Note that, in the following description, the LTE includes the LTE-A, the LTE-A Pro, and the EUTRA, and the NR includes the NRAT and the FEUTRA. In the LTE, a base station device (base station) is also referred to as evolved NodeB (eNodeB), in the NR, the base station device (base station) is also referred to as gNodeB, and in the LTE and the NR, a terminal device (mobile station, mobile station device, or terminal) is also referred to as user equipment (UE). The LTE and the NR are cellular communication systems in which a plurality of areas covered by a base station device are arranged in a cell shape. A single base station device may manage a plurality of cells.

The NR is a next-generation radio access scheme for the LTE, and is a radio access technology (RAT) different from the LTE. The NR is an access technology that can support various use cases including enhanced mobile broadband (eMBB), massive machine type communications (mMTC), and ultra reliable and low latency communications (URLLC). The NR has been studied for a technical framework that addresses usage scenarios, requirements, arrangement scenarios, and the like in those use cases.

In the NR, an error correction code has been considered due to an increase in demand for high reliability and low latency. Non Patent Literature 1 discloses a technology related to error correction studied in the NR.

CITATION LIST

Non Patent Literature

Non Patent Literature 1: 3GPP TS 38.212 V15.7.0 (2019-09), "Multiplexing and channel coding (Release 15)"

SUMMARY

Technical Problem

In order to implement communication with higher reliability and lower latency, error correction processing capable of enabling higher reliability and lower delay is required in the future.

Therefore, the present disclosure provides a communication device and a communication method capable of implementing highly reliable and low-latency error correction processing.

Solution to Problem

According to the present disclosure, a communication device is provided. The communication device includes a redundant data generation unit, a signal generation unit, and a transmission unit. The redundant data generation unit performs error correction coding processing on combined data obtained by combining first data and second data to generate redundant data used for error correction. The signal generation unit generates a transmission signal based on the second data and the redundant data. The transmission unit transmits the transmission signal to another communication device.

BRIEF DESCRIPTION OF DRAWINGS

FIG. 3 is a table used to generate an LDPC base graph $H_{BG}$.

FIG. 18 is a diagram for explaining error correction processing according to the present embodiment.

FIG. 19 is a diagram for explaining error correction processing according to the present embodiment.

FIG. 21A is a diagram for explaining an example of LDPC coding processing according to an embodiment of the present disclosure.

FIG. 21B is a diagram for explaining an example of the LDPC coding processing according to an embodiment of the present disclosure.

FIG. 21C is a diagram for explaining an example of the LDPC coding processing according to an embodiment of the present disclosure.

FIG. 21D is a diagram for explaining an example of the LDPC coding processing according to an embodiment of the present disclosure.

FIG. 22 is a table for extracting parameters used in the LDPC coding processing.

DESCRIPTION OF EMBODIMENTS

Figure 1:
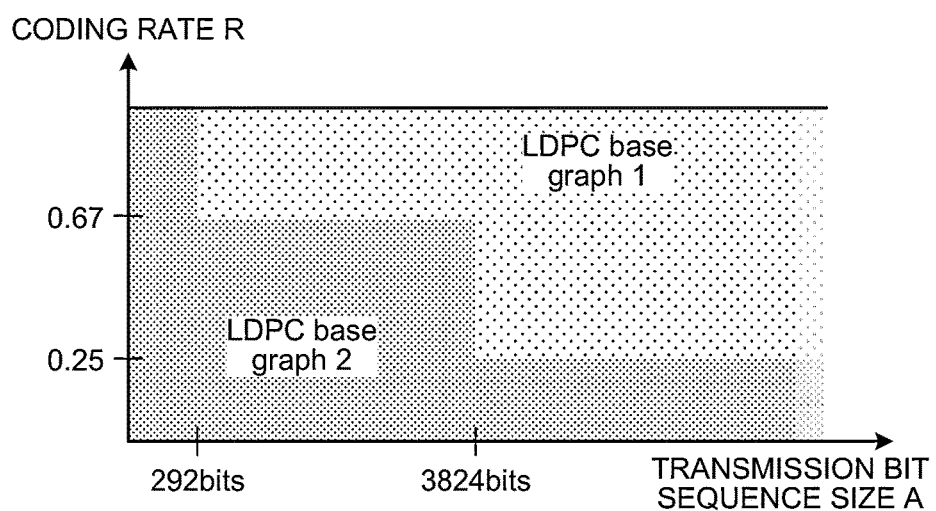
FIG. 1 is a diagram for explaining a type of an LDPC base graph.

Hereinafter, preferred embodiments of the present disclosure will be described in detail with reference to the appended drawings. Note that, in the present specification and the drawings, components having substantially the same functional configuration are provided with the same reference signs, so that an overlapping description of these components is omitted.

In the following description, for example, a numerical value may be described as a specific example, but such a numerical value is an example, and another numerical value may be used.

Note that the description will be provided in the following order.

1. Introduction
1.1. Error Correction Processing
1.1.1. Error Correction Coding Processing
1.1.2. Error Correction Decoding Processing
1.2. Overview of Proposed Technology
2. Configuration of Communication System
2.1. Configuration of Management Device
2.2. Configuration of Base Station Device
2.3. Configuration of Relay Device
2.4. Configuration of Terminal Device
3. Error Correction Processing
3.1. Error Correction Coding Processing
3.2. Error Correction Decoding Processing
3.3. Flow of Processing
3.4. Effects
4. Notification Processing
5. Other Embodiments
6. Example of LDPC Coding Processing
7. Application Example
8. Supplementary Description

1. INTRODUCTION 1.1. Error Correction Processing

As an example of conventional error correction processing, transmission-side processing (error correction coding processing) and reception-side processing (error correction decoding processing) for a low-density parity-check code (LDPC) will be described. The LDPC is a technology in which a transmission side (transmitter) adds a parity bit for error correction to a transmission bit sequence so that a reception side (receiver) can perform error correction.

1.1.1. Error Correction Coding Processing

First, error correction coding processing on a transmission side will be described. The error correction coding processing is performed by a transmitter (not illustrated) according to the following procedure.

1) Determining type of LDPC base graph
2) Adding cyclic redundancy check (CRC) bit to transmission bit sequence
3) Performing division into plurality of code blocks (CB)
4) Adding CRC bit to each CB
5) Generating LDPC base graph
6) Deriving parity bit sequence and adding parity bit sequence to CB bit sequence
7) Adjusting transmission bit sequence size (rate matching)
8) Performing bit interleaving processing
9) Combining all CBs Details of each procedure will be sequentially described below.

1) Determining Type of LDPC Base Graph

First, the transmitter determines a type of an LDPC base graph necessary for deriving a parity bit sequence of the LDPC. In the LDPC of 5G, two types of LDPC base graphs are selectively used according to two values, a transmission bit sequence size and a coding rate.

FIG. 1 is a diagram for explaining the type of the LDPC base graph. FIG. 1 illustrates a relationship between the transmission bit sequence size and the coding rate, and the LDPC base graph. As illustrated in FIG. 1, an LDPC base graph 2 is mainly used in a case where the transmission bit sequence size is small or in a case where the coding rate is low. On the other hand, an LDPC base graph 1 is used in a case where the LDPC base graph 2 is not used, in other words, mainly in a case where the transmission bit sequence size is large or the coding rate is high.

More specifically, when the transmission bit sequence size is A and the coding rate is R, in a case where any of the following conditions is satisfied, the transmitter selects the LDPC base graph 2, and in a case where the following conditions are not satisfied, the transmitter selects the LDPC base graph 1.

$A \leq 292$ bits
$A \leq 3824$ bits and $R \leq 0.67$
$R \leq 0.25$

2) Adding CRC to Transmission Bit Sequence

Figure 2:
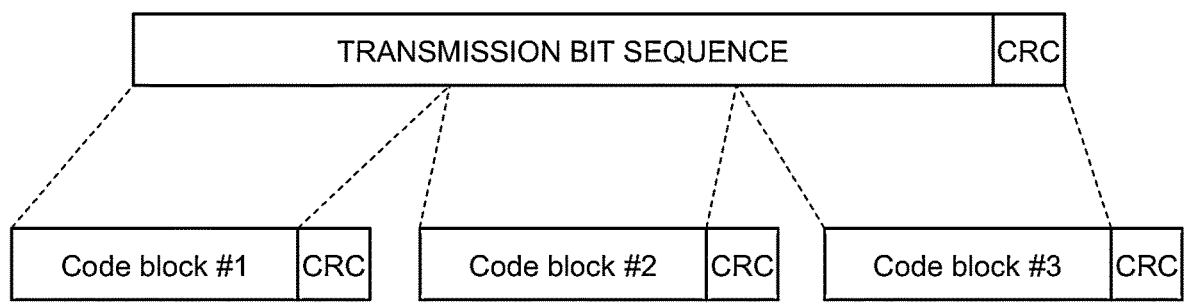
FIG. 2 is a diagram for explaining error correction coding processing performed by a transmitter.

FIG. 2 is a diagram for explaining error correction coding processing performed by the transmitter. As illustrated on the upper side of FIG. 2, the transmitter adds a CRC bit to the transmission bit sequence. There are two types of CRC bit sizes: 24 bits and 16 bits. The transmitter determines which size of CRC to add according to the transmission bit sequence size. Specifically, in a case where the transmission bit sequence size A is $A > 3824$ bits, the transmitter adds a 24-bit CRC, and otherwise ($A \leq 3824$ bits), the transmitter adds a 16-bit CRC.

3) Performing Division into Plurality of Code Blocks (CB)

Next, in a case where the transmission bit sequence size A after addition of the CRC bit is larger than a predetermined size, the transmitter divides the transmission bit sequence into a plurality of code blocks (CBs) as illustrated in FIG. 2, and applies channel coding to each CB. In a case of the LDPC base graph 1, the size of one CB is 8448 bits, and in a case of the LDPC base graph 2, the size of one CB is 3840 bits.

In a case where the transmission bit sequence size A after addition of the CRC bit in the above-described procedure 2) is larger than the above-described size of one CB, the transmitter performs CB division. The transmission bit sequence is equally divided into respective CBs, and in a case where the size of the CB is not satisfied, a NULL signal called filler bits is padded.

4) Adding CRC Bit to Each CB

In a case where the transmission bit sequence is divided into a plurality of CBs in the procedure 3), the transmitter adds CRC bits of 24 bits to each CB as illustrated on the lower side of FIG. 2. Note that in a case where the number of CBs is one, no CRC bit is added to the CB. As described above, in a case where the transmission bit sequence size A after addition of the CRC is equal to or smaller than the predetermined size described above, the procedures 3) and 4) are omitted.

5) Generating LDPC Base Graph

FIG. 3 is a table used to generate an LDPC base graph $H_{BG}$. The transmitter generates the LDPC base graph by using the table illustrated in FIG. 3 in order to derive the parity bit sequence in each CB. The LDPC base graph is generated by a combination of unit cyclic shift matrices. The table illustrated in FIG. 3 is an excerpt from Table 5.3.2-2 of TS 38.212 for describing an LDPC base graph generating method.

$H_{BG}$ is a matrix including unit cyclic shift matrices, and is expressed by the following formula.

[Math. 1]

$$H_{BG} = \begin{bmatrix} V_{0,0} & \cdots & \cdots & \cdots & V_{0,J} \\ \vdots & \ddots & & & \vdots \\ \vdots & & V_{i,j} & & \vdots \\ \vdots & & & \ddots & \vdots \\ V_{I,0} & \cdots & \cdots & \cdots & V_{I,J} \end{bmatrix} \quad (1)$$

Here, $V_{i,j}$ represents a matrix obtained by cyclically shifting an identity matrix of size $Z_c$ to the right by $V_{i,j}$. Here, the size $Z_c$ of the identity matrix is determined according to the size of the transmission bit sequence included in one CB. In addition, a set index $i_{LS}$ in the table illustrated in FIG. 3 is similarly determined according to the size of the transmission bit sequence included in one CB.

For example, in a case where $i_{LS}=0$, the first column of $H_{BG}$ is expressed by the following Formula (2).

[Math. 2]

$$H_{BG} = \begin{bmatrix} 250 & \cdots & V_{0,J} \\ 69 & & \\ 226 & & \\ 159 & & \vdots \\ \text{Null} & & \\ \vdots & & \vdots \\ 239 & & \\ 31 & & \vdots \\ 1 & & \\ 0 & \cdots & V_{I,J} \end{bmatrix} \quad (2)$$

In a case where a numerical value of an element of the matrix shown in Formula (2) is 1 or more, each numerical value represents a matrix obtained by cyclically shifting the identity matrix of the size $Z_c$ to the right by the numerical value. In a case where the numerical value is "0", the numerical value represents a matrix obtained by cyclically shifting the identity matrix of the size $Z_c$ to the right by 0 times, that is, the identity matrix of the size $Z_c$ itself. In a case where the numerical value is null, the numerical value represents a zero matrix of the size $Z_c$.

As described above, the transmitter generates the LDPC base graph by calculating and combining the unit cyclic shift matrices.

6) Deriving Parity Bit Sequence and Adding Parity Bit Sequence to CB Bit Sequence The transmitter calculates the parity bit sequence based on the LDPC base graph generated in the procedure 5) and the transmission bit sequence included in the CB.

When the LDPC base graph is H, the transmission bit sequence included in the CB is $c=[c_0, c_1, \ldots, c_{K-1}]^T$, and the parity bit sequence is $w=[w_0, w_1, \ldots, w_{N+2Z_c-K-1}]^T$, the transmitter derives the parity bit sequence w by calculating w satisfying the following Formula (3). Here, K represents the size of the transmission bit sequence included in the CB, N represents the transmission bit sequence size A after addition of the parity bit sequence, and "0" represents a zero matrix.

[Math. 3]

$$H \times \begin{bmatrix} c \\ w \end{bmatrix} = 0 \quad (3)$$

After deriving w, the transmitter generates a transmission bit sequence d after addition of the parity bit as $d=[c_{2z_c}, c_{2z_c+1}, \ldots, c_{K-1}, w_0, w_1, \ldots, w_{N+2Z_c-K-1}]^T$.

7) Adjusting Transmission Bit Sequence Size (Rate Matching)

Figure 4:
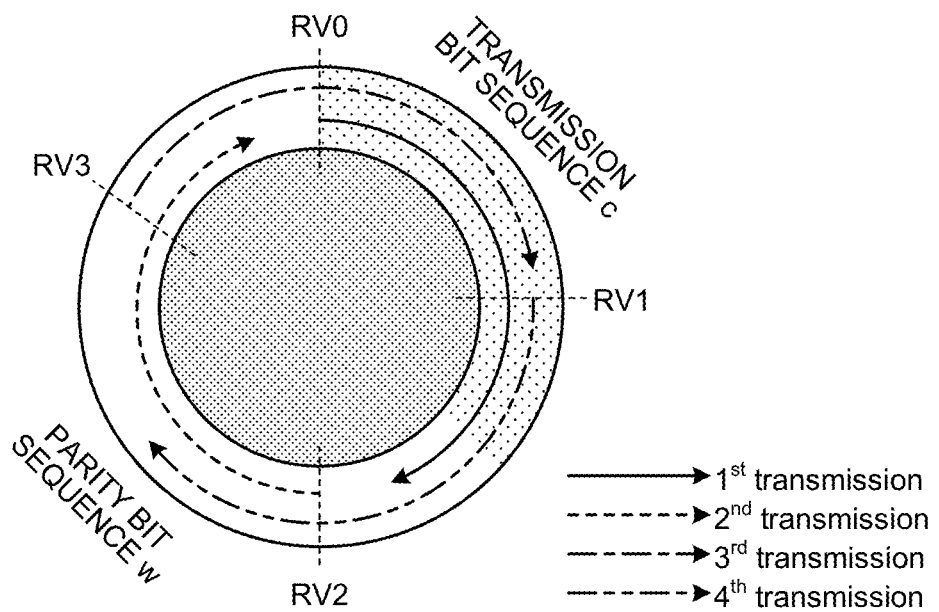
FIG. 4 is a diagram for explaining rate matching processing.

FIG. 4 is a diagram for explaining rate matching processing. The transmitter adjusts the size of the transmission bit sequence d after addition of the parity bit generated in the procedure 6) in accordance with a transmittable data size. The adjustment of the transmission bit sequence size is implemented by processing called rate matching.

First, the transmitter puts the transmission bit sequence d illustrated in FIG. 4 into a circular-shaped buffer called a circular buffer from the head (for example, RV0 in FIG. 4). Note that the end of the transmission bit sequence d is arranged adjacent to the head of the circular-shaped buffer, in other words, the head of the transmission bit sequence d. That is, the size of the circular buffer is equal to the size of the transmission bit sequence d. In the example of FIG. 4, a transmission bit sequence c included in the transmission bit sequence d is arranged in a region indicated by a dot pattern of the circular buffer, and the parity bit sequence w is arranged in a white region.

Thereafter, the transmitter performs processing of reading a bit sequence by a transmittable data size from a data read start position called redundancy version (RV). In a case where one round of the circular buffer is done, the second week starts, and data reading is continued until the transmittable data size is reached.

For example, in a case of first transmitting the transmission bit sequence d (first transmission), the transmitter reads the bit sequence by a transmittable data size indicated by a solid line from RV0 illustrated in FIG. 4. Thereafter, in a case of retransmitting the same bit sequence d (first retransmission), the transmitter reads a bit sequence corresponding to a transmittable data size indicated by a dotted line from RV2 illustrated in FIG. 4. In a case of retransmitting the same transmission bit sequence d (second retransmission), the transmitter reads a bit sequence corresponding to a transmittable data size indicated by a line with alternating long and short dashes from RV3 illustrated in FIG. 4. In a case of retransmitting the same transmission bit sequence d (third retransmission), the transmitter reads a bit sequence corresponding to a transmittable data size indicated by a line with alternating long and two short dashes from RV1 illustrated in FIG. 4.

8) Performing Bit Interleaving Processing

Figure 5:
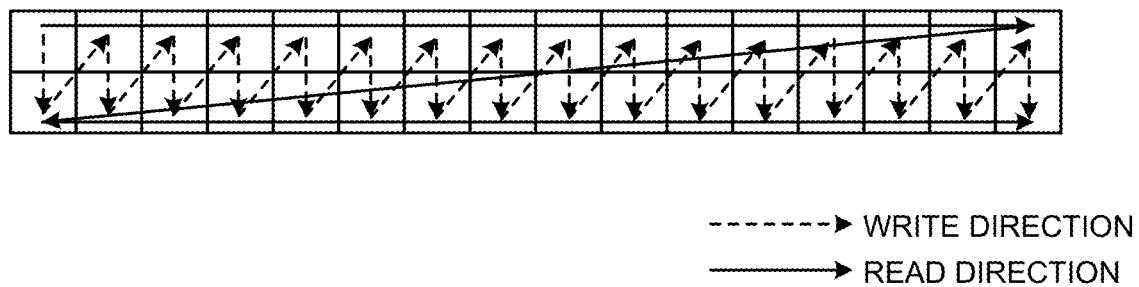
FIG. 5 is a diagram for explaining bit interleaving processing.

FIG. 5 is a diagram for explaining bit interleaving processing. After performing the rate matching processing in the procedure 7), the transmitter applies the bit interleaving processing to the bit sequence after the rate matching processing. For example, as indicated by a dotted arrow in FIG. 5, the transmitter writes the bit sequence after the rate matching processing to the buffer while moving vertically from the upper left side to the lower right side of the buffer. Subsequently, the transmitter reads the bit sequence after the rate matching processing from the buffer while moving horizontally from the upper left side to the lower right side of the buffer, for example, as indicated by a solid arrow in FIG. 5. Note that lengths of columns and rows of the buffer are determined according to a modulation scheme (QPSK or QAM). For example, the length of the column is 2 in the QPSK, the length of the column is 4 in 16QAM, and the length of the column is 6 in 64QAM.

9) Combining All CBs

Finally, the transmitter combines all CBs subjected to the bit interleaving processing into one bit sequence. Here, the transmitter does not perform processing of changing an arrangement order of the CBs, and sequentially arranges and combines all the CBs as they are.

As described above, the transmitter performs the error correction coding processing on the transmission bit sequence by performing the procedures 1) to 9). Thereafter, the transmitter performs processing such as modulation and multiplexing on the transmission bit sequence subjected to the error correction coding processing to generate a transmission signal, and transmits the transmission signal from an antenna (not illustrated).

1.1.2. Error Correction Decoding Processing

Next, error correction decoding processing on a reception side will be described. The error correction decoding processing is performed by a receiver (not illustrated) according to the following procedure.

1) Performing division into CBs and performing inverse processing of bit interleaving and rate matching
2) Performing LDPC decoding
3) Combining CBs to decode transmission bit sequence Details of each procedure will be sequentially described below.

1) Performing Division into CBs and Performing Inverse Processing of Bit Interleaving and Rate Matching The receiver first divides a combined CB included in a reception signal into a plurality of CBs. Subsequently, the receiver performs inverse processing of the bit interleaving and rate matching performed in the procedures 7) and 8) of the error correction coding processing on the transmission side for each divided CB.

The inverse processing of the bit interleaving is performed by reversing reading and writing performed by the transmitter in the procedure 7) of the error correction coding processing and performing reading and writing of data by the receiver.

As the inverse processing of the rate matching, the receiver first writes a reception signal sequence of the CB to the circular buffer with the read start position (redundancy version (RV)) of the procedure 8) of the error correction coding processing as a write start position. Subsequently, the receiver performs processing of reading data for one round from the head of the circular buffer (see RV0 in FIG. 5).

2) Performing LDPC Decoding

Figure 6:
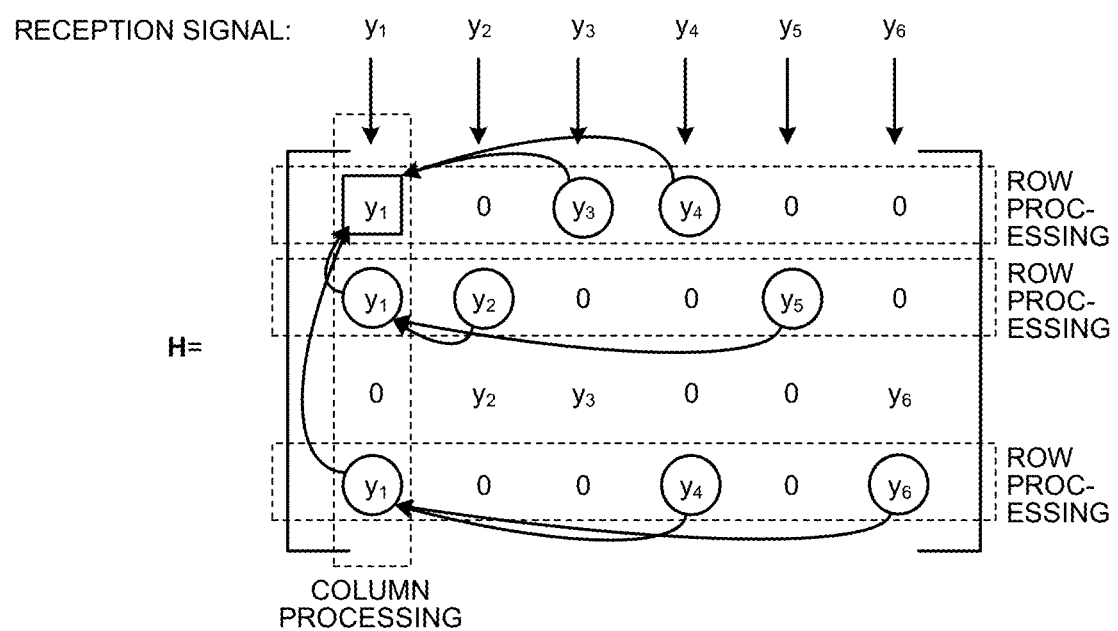
FIG. 6 is a diagram for explaining LDPC decoding processing.

FIG. 6 is a diagram for explaining LDPC decoding processing. The receiver performs LDPC decoding processing on the reception signal sequence subjected to the inverse processing of the procedure 1). The receiver implements, for example, a scheme called a belief propagation (BP) algorithm as an algorithm of the LDPC decoding processing. The BP algorithm is processing of correcting an error by repeating processing called row processing and column processing. Specific processing will be described below.

First, the receiver performs the row processing and the column processing based on the LDPC base graph. Hereinafter, in order to simplify the description, as illustrated in FIG. 6, an LDPC base graph having a size of 4×6 and log-likelihood ratios (LLRs) $y_1$ to $y_6$ of the reception signal will be described as examples. Here, the LLR is a numerical value indicating "likelihood", and here, is a numerical value indicating whether the reception signal is likely to be "0" or "1". By repeatedly performing the following row processing and column processing, the LLR is updated, and a more likely LLR value can be obtained.

The receiver first inputs, for each column of the LDPC base graph, the LLRs $y_1$ to $y_6$ of the reception signal as initial values. Here, the receiver inputs an initial value to an element that is "1" among the elements of the LDPC base graph. On the other hand, an element that is "0" is not used for the processing here, and thus the initial value is not input.

Subsequently, the receiver performs the row processing. In the row processing, a value of a column other than the LLR to be updated is reflected to the LLR to be updated. For example, in a case of updating the LLR $y_1$ in FIG. 6, the receiver reflects values of $y_3$ and $y_4$ in the first row to $y_1$ in the first row. Similarly, the receiver reflects values of $y_2$ and $y_5$ in the second row to $y_1$ in the second row, and reflects values of $y_4$ and $y_6$ in the fourth row to $y_1$ in the fourth row. Here, since there is no $y_1$ in the third row, the receiver does not perform the row processing of the third row. The receiver also performs the row processing on $y_2$ to $y_6$ similarly to $y_1$.

The receiver that has performed the row processing on all $y_1$ to $y_6$ performs the column processing. In the column processing, a value in a row other than the LLR to be updated is reflected to the LLR to be updated. For example, in a case of updating $y_1$ in the first row in FIG. 6, the receiver adds values of $y_1$ in the second and fourth rows to $y_1$ in the first row. Similarly, the receiver updates $y_1$ in the second row by adding values of $y_1$ in the first and fourth rows to $y_1$ in the second row. Similarly, the receiver updates $y_1$ in the fourth row by adding values of $y_1$ in the first and second rows to $y_1$ in the fourth row. The receiver also performs the column processing on $y_2$ to $y_6$ similarly to $y_1$.

After performing the row processing and the column processing, the receiver decodes the transmission bit sequence from the reception signal sequence by taking the sum of the LLRs for each column and performing bit determination of "0" or "1". Furthermore, as the receiver repeatedly performs the row processing and the column processing, an LLR with higher accuracy can be obtained.

The receiver may repeat the row processing and the column processing a predetermined number of times, or may repeat the row processing and the column processing until no error is detected when checking using the CRC is performed in the subsequent processing.

3) Combining CBs to Decode Transmission Bit Sequence

Finally, the receiver combines the transmission bit sequences decoded in each CB into one transmission bit sequence. By performing the above processing, the receiver decodes the transmission bit sequence from the reception signal.

1.2. Overview of Proposed Technology

In communication, reception characteristics deteriorate due to variation of a propagation path. For example, even in a case where a signal transmitted from the transmitter passes through the propagation path and is received by the receiver, sufficient reception signal power cannot be obtained by the receiver due to a propagation path characteristic in some cases. In this case, the receiver cannot correctly demodulate the signal, and an error occurs in received data.

In order to reduce an influence of such variation in propagation path characteristic and achieve more reliable and low-latency communication, efficient application of the error correction technology is desired. In the above-described error correction technology, it is necessary to repeatedly perform the row processing and the column processing in order to improve reliability, and there is a problem that a latency increases. In addition, since the row processing and the column processing are performed for each transmission data sequence (transmission bit sequence) divided into the CBs, there is a problem that a load on the receiver increases due to the repetition processing.

Figure 7:
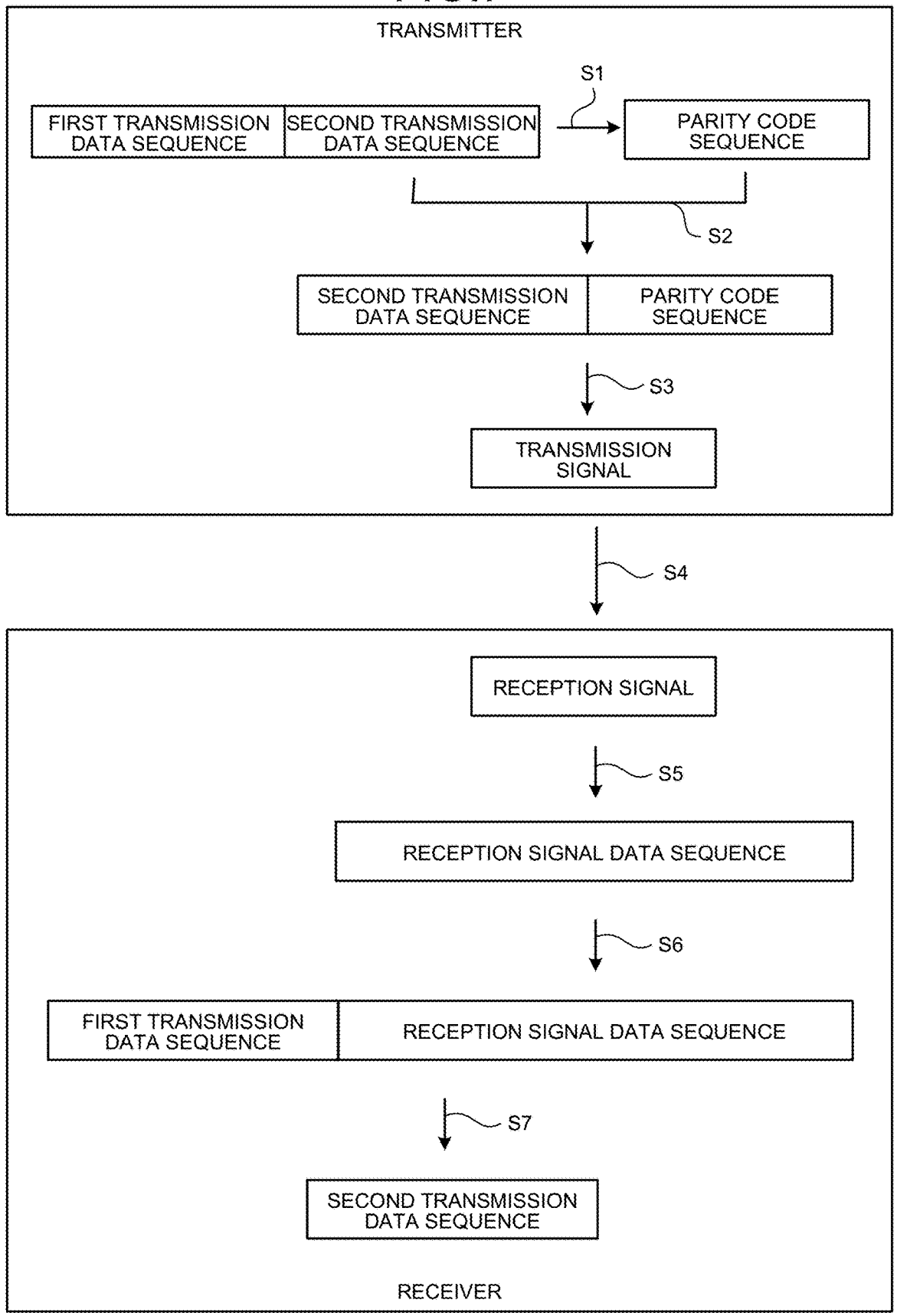
FIG. 7 is a diagram for explaining an overview of an error correction technology of the present disclosure.

Therefore, the present disclosure proposes an error correction technology capable of achieving more reliable and low-latency communication. Hereinafter, an overview of the error correction technology of the present disclosure will be described with reference to FIG. 7. FIG. 7 is a diagram for explaining the overview of the error correction technology of the present disclosure. Note that second transmission data illustrated in FIG. 7 is the transmission bit sequence c included in each CB obtained by performing, by the transmitter, the above-described procedures 1) to 3) to a transmission signal bit sequence to be transmitted to the receiver to perform division into at least one CB. In addition, it is assumed that first transmission data is a known signal sequence acquired by each of the transmitter side and the receiver side.

The transmitter that has performed the procedures 1) to 3) to generate a second transmission data sequence that is the transmission bit sequence c combines a first transmission data sequence with the second transmission data sequence, and performs parity code generation processing on the combined data sequence to generate a parity code sequence (Step S1).

Next, the transmitter combines the generated parity code sequence and the second transmission data sequence (Step S2). The transmitter generates a transmission signal by performing modulation processing, multiplexing processing, and the like on the combined parity code sequence and second transmission data sequence (Step S3), and transmits the transmission signal (Step S4).

The receiver receives a signal transmitted from the transmitter as a reception signal, and performs processing such as demultiplexing and demodulation to acquire a reception signal data sequence (Step S5). The receiver combines the reception signal data sequence and the first transmission data sequence (Step S6), and performs decoding processing on the combined data sequence to acquire the second transmission data sequence (Step S7).

In this manner, the transmitter combines the first transmission data sequence, which is a known data signal, with the second transmission data sequence to generate the parity code sequence. As a result, the receiver can perform decoding processing based on the known data signal and the reception signal. Since "1" and "0" of the known data signal are known in advance, reliability of the LLR at the time of performing the decoding processing is high. As described above, since the decoding processing of the reception signal can be performing using the LLR with high reliability, the receiver can reduce the number of repetitions of the row processing and the column processing. Therefore, according to the proposed technology of the present disclosure, it is possible to implement highly reliable and low-latency communication. In addition, the load of the decoding processing performed by the receiver can be reduced.

Although the overview of the embodiment of the present disclosure has been described above, a communication system 1 according to an embodiment of the present disclosure will be described in detail below.

2. CONFIGURATION OF COMMUNICATION SYSTEM

Figure 8:
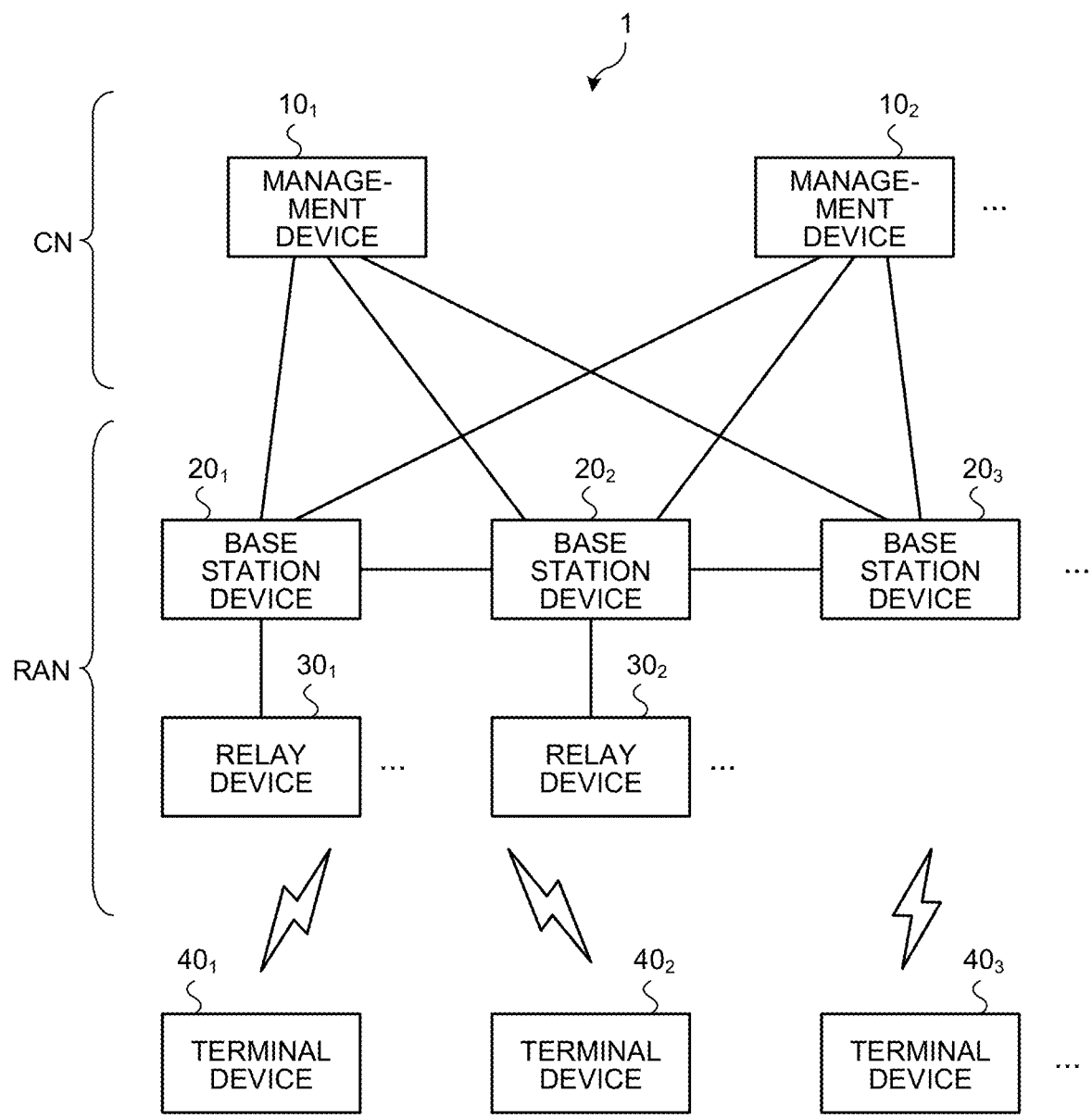
FIG. 8 is a diagram illustrating an example of a configuration of a communication system according to an embodiment of the present disclosure.

FIG. 8 is a diagram illustrating an example of a configuration of the communication system 1 according to an embodiment of the present disclosure. The communication system 1 is a wireless communication system that provides a radio access network to a terminal device. For example, the communication system 1 is a cellular communication system using a radio access technology such as LTE or NR.

As illustrated in FIG. 8, the communication system 1 includes a management device 10, a base station device 20, a relay device 30, and a terminal device 40. In the communication system 1, wireless communication devices constituting the communication system 1 are operated in cooperation to provide a wireless network capable of mobile communication to a user. The wireless network of the present embodiment includes a radio access network RAN and a core network CN. Note that the transmitter and the receiver described above are, for example, devices having a wireless communication function, and correspond to the base station device 20, the relay device 30, and the terminal device 40 in the example of FIG. 8.

The communication system 1 may include a plurality of management devices 10, a plurality of base station devices 20, a plurality of relay devices 30, and a plurality of terminal devices 40. In the example of FIG. 8, the communication system 1 includes management devices $10_1$, $10_2$, and the like as the management device 10. Furthermore, the communication system 1 includes base station devices $20_1$, $20_2$, $20_3$, and the like as the base station device 20, and includes relay devices $30_1$, $30_2$, and the like as the relay device 30. Furthermore, the communication system 1 includes terminal devices $40_1$, $40_2$, $40_3$, and the like as the terminal device 40.

Note that the devices in the drawing may be considered as devices in a logical sense. That is, some devices in the drawing may be implemented by a virtual machine (VM), a container, a docker, or the like, and may be implemented on the physically same hardware.

Note that a base station in the LTE may be referred to as an evolved node B (eNodeB) or an eNB. Further, a base station in the NR may be referred to as a gNodeB or a gNB.

In the LTE and NR, a terminal device (also referred to as a mobile station, a mobile station device, or a terminal) may be referred to as user equipment (UE). Note that the terminal device is a type of communication device, and is also referred to as a mobile station, a mobile station device, or a terminal.

In the present embodiment, the concept of the communication device includes not only a portable mobile device (terminal device) such as a mobile terminal but also a device installed in a structure or mobile body. The structure or mobile body itself may be regarded as the communication device. In addition, the concept of the communication device includes not only a terminal device but also a base station device and a relay device. The communication device is a type of processing device and information processing device. Furthermore, the communication device can be rephrased as a transmission device or a reception device.

[Management Device]

The management device 10 is a device that manages a wireless network. For example, the management device 10 is a device that manages communication of the base station device 20. For example, the management device 10 is a device that functions as a mobility management entity (MME), an access and mobility management function (AMF), or a session management function (SMF).

The management device 10 constitutes the core network CN together with a gateway device and the like. The core network CN is, for example, a network of a predetermined entity such as a mobile communication carrier. For example, the core network CN is evolved packet core (EPC) or 5G core network (5GC). Note that the predetermined entity may be the same as or different from an entity that uses, operates, and/or manages the base station device 20.

Note that the management device 10 may have a function of a gateway. For example, in a case where the core network is the EPC, the management device 10 may have a function as an S-GW or a P-GW. Further, in a case where the core network is the 5GC, the management device 10 may have a function as a user plane function (UPF). Note that the management device 10 does not necessarily have to be a device constituting the core network CN. For example, it is assumed that the core network CN is a core network of wideband code division multiple access (W-CDMA) or code division multiple access 2000 (cdma2000). At this time, the management device 10 may be a device that functions as a radio network controller (RNC).

The management device 10 may be directly or indirectly connected to each of the plurality of base station devices 20 to manage communication of the base station device 20. For example, the management device 10 may grasp and manage, for each terminal device 40, which base station device (or which cell) the terminal device 40 is connected to, which base station device (or which cell) the terminal device 40 is present in a communication area (for example, a tracking area, a routing area, and a RAN notification area), and the like.

[Base Station Device]

The base station device 20 is a wireless communication device that operates a cell and wirelessly communicates with the terminal device 40. The base station device 20 is a type of communication device. A plurality of base stations may be connected to each other. One or more base stations may be included in the radio access network (RAN). That is, the base station may be simply referred to as a RAN, a RAN node, an access network (AN), or an AN node. The RAN in the LTE is referred to as an enhanced universal terrestrial RAN (EUTRAN). The RAN in the NR is referred to as an NGRAN. The RAN in W-CDMA (UMTS) is referred to as a UTRAN. The base station in the LTE is referred to as an evolved node B (eNodeB) or an eNB. That is, the EUTRAN includes one or more eNodeBs (eNBs). Further, the base station in the NR is referred to as a gNodeB or a gNB. That is, the NGRAN includes one or more gNBs. Further, the EUTRAN may include a gNB (en-gNB) connected to the core network (EPC) in the communication system (EPS) of the LTE. Similarly, the NGRAN may include an ng-eNB connected to the core network 5GC in a 5G communications system (5GS). In addition or instead, in a case where the base station is an eNB, a gNB, or the like, the base station may be referred to as 3GPP access. In addition or instead, in a case where the base station is a wireless access point, the base station may be referred to as non-3GPP access. In addition or instead, the base station may be an optical feeder device which is called a remote radio head (RRH). In addition or instead, in a case where the base station is a gNB, the base station may be referred to as a combination of a gNB central unit (CU) and a gNB distributed unit (DU) described above or any of them. The gNB CU hosts a plurality of higher layers (for example, radio resource control (RRC), service data adaptation protocol (SDAP), and PDCP) of the access stratum for communication with the UE. On the other hand, the gNB-DU hosts a plurality of lower layers (for example, RLC, MAC, and PHY) of the access stratum. That is, among messages/information to be described later, RRC signaling (semi-static notification) may be generated by the gNB CU, while DCI (dynamic notification) may be generated by the gNB-DU. Alternatively, in an RRC configuration (semi-static notification), for example, some configurations such as IE: cellGroupConfig may be generated by the gNB-DU, and the remaining configurations may be generated by the gNB-CU. These configurations may be transmitted and received by an F1 interface to be described later. The base station may be configured to be able to perform communication with another base station. For example, in a case where a plurality of base station devices are eNBs or a combination of eNBs and en-gNBs, the base station devices may be connected by an X2 interface. In addition or instead, in a case where a plurality of base stations are eNBs or a combination of gn-eNBs and gNBs, the devices may be connected by an Xn interface. In addition or instead, in a case where a plurality of base stations are a combination of gNB CUs and gNB DUs, the devices may be connected by the above-described F1 interface. The messages/information (RRC signaling or DCI information) to be described later may be communicated between a plurality of base stations (for example, via the X2, Xn, or F1 interface).

Furthermore, the base station device 20 may be an integrated access and backhaul (IAB) donor node or IAB relay node that provides a radio access line and a radio backhaul line by time division multiplexing, frequency division multiplexing, or space division multiplexing.

A cell provided by the base station is called a serving cell. The serving cell includes a primary cell (PCell) and a secondary cell (SCell). In a case where Dual Connectivity (for example, EUTRA-EUTRA Dual Connectivity, EUTRA-NR Dual Connectivity (ENDC), EUTRA-NR Dual Connectivity with 5GC, NR-EUTRA Dual Connectivity (NEDC), or NR-NR Dual Connectivity) is provided to the UE (for example, terminal device 40), the PCell and zero or one or more SCells provided by a master node (MN) are referred to as a master cell group. Further, the serving cell may include a primary secondary cell or a primary SCG Cell (PSCell). That is, in a case where the Dual Connectivity is provided to the UE, the PSCell and zero or one or more SCells provided by a secondary node (SN) are referred to as a secondary cell group (SCG). Unless specially configured (for example, physical uplink control channel (PUCCH) on SCell), the PUCCH is transmitted by the PCell and the PSCell, not by the SCell. Radio link failure is detected in the PCell and the PSCell, and is not detected (does not have to be detected) in the SCell. Since the PCell and the PSCell have a special role in the serving cell(s) as described above, they are also called special cells (SpCells). One downlink component carrier and one uplink component carrier may be associated with one cell. Further, a system bandwidth corresponding to one cell may be divided into a plurality of bandwidth parts. In this case, one or more bandwidth parts may be set in the UE and one bandwidth part may be used in the UE as an active BWP. Further, radio resources (for example, a frequency band, numerology (subcarrier spacing), and slot configuration) that can be used by the terminal device 40 may be different for each cell, each component carrier, or each BWP.

Note that the radio access technology used by the base station device 20 may be cellular communication technology or wireless LAN technology. It is a matter of course that the radio access technology used by the base station device 20 is not limited thereto, and may be another radio access technology. The radio access technology used by the base station device 20 may be a low power wide area (LPWA) communication technology. Here, LPWA communication is communication conforming to a LPWA standard. Examples of the LPWA standard include ELTRES, ZETA, SIGFOX, LoRaWAN, and NB-Iot. It is a matter of course that the LPWA standard is not limited thereto, and may be other LPWA standards. In addition, wireless communication used by the base station device 20 may be wireless communication using millimeter waves. Further, the wireless communication used by the base station device 20 may be wireless communication using radio waves or (optical) wireless communication using infrared rays or visible light.

Note that the base station devices 20 may be able to communicate with each other via a base station device-core network interface (for example, S1 Interface, NG Interface, or the like). This interface may be either a wired interface or a wireless interface.

The base station device 20 may be used, operated, and/or managed by various entities. For example, the entity may be assumed to be a mobile network operator (MNO), a mobile virtual network operator (MVNO), a mobile virtual network enabler (MVNE), a neutral host network (NHN) operator, an enterprise, an educational institution (an educational institution, a board of a local government, or the like), a real estate (building, apartment, or the like) administrator, an individual, or the like.

It is a matter of course that the entity of the use, operation, and/or management of the base station device 20 is not limited thereto. The base station device 20 may be installed and/or operated by one business operator, or may be installed and/or operated by one individual. It is a matter of course that the entity who installs/operates the base station device 20 is not limited thereto. For example, the base station device 20 may be jointly installed/operated by a plurality of business operators or a plurality of individuals. Further, the base station device 20 may be a shared facility used by a plurality of business operators or a plurality of individuals. In this case, the installation and/or operation of the facility may be carried out by a third party different from the user.

Note that the concept of the base station device (also referred to as the base station) includes not only a donor base station but also a relay base station (also referred to as a relay station or a relay station device). Further, the concept of the base station includes not only a structure having the function of the base station, but also a device installed in the structure.

Note that the concept of the base station device (also referred to as the base station) includes not only a donor base station but also a relay base station (also referred to as a relay station or a relay station device). Further, the concept of the base station includes not only a structure having the function of the base station, but also a device installed in the structure.

The structure is, for example, a building such as a skyscraper, a house, a steel tower, a station facility, an airport facility, a port facility, or a stadium. Note that the concept of the structure includes not only a building, but also a non-building structure such as a tunnel, a bridge, a dam, a fence, or a steel column, or a facility such as a crane, a gate, or a windmill. In addition, the concept of the structure includes not only a structure on land (on the ground in a narrow sense) or in the ground, but also a structure on the water, such as a landing stage or Mega-Float, or a structure underwater such as an oceanographical observation facility. The base station device can be rephrased as a processing device or an information processing device.

The base station device 20 may be a donor station or a relay station. Furthermore, the base station device 20 may be a fixed station or a mobile station. The mobile station is a wireless communication device (for example, the base station device) configured to be movable. Here, the base station device 20 may be a device installed on a mobile body, or may be the mobile body itself. For example, a relay station device having mobility can be regarded as the base station device 20 as the mobile station. In addition, a device that originally has mobility, such as a vehicle, a drone, or a smartphone, and has the function of the base station device (at least a part of the function of the base station device) also corresponds to the base station device 20 as the mobile station.

Here, the mobile body may be a mobile terminal such as a smartphone or a mobile phone. The mobile body may be a mobile body (for example, a vehicle such as an automobile, a bicycle, a bus, a truck, a motorcycle, a train, or a linear motor car) that moves on land (on the ground in a narrow sense), or may be a mobile body (for example, subway) that moves in the ground (for example, in a tunnel).

Further, the mobile body may be a mobile body (for example, a vessel such as a passenger ship, a cargo ship, or a hovercraft) that moves on the water, or may be a mobile body (for example, a submersible boat such as a submersible, a submarine, or an unmanned underwater vehicle) that moves underwater.

Further, the mobile body may be a mobile body (for example, an aircraft such as an airplane, an airship, or a drone) that moves in the atmosphere, or may be a mobile body (for example, an artificial celestial body such as an artificial satellite, a spaceship, a space station, a space probe) that moves outside the atmosphere. The mobile body that moves outside the atmosphere can be rephrased as a space mobile body.

Furthermore, the base station device 20 may be a ground base station device (ground station device) installed on the ground. For example, the base station device 20 may be a base station device arranged in a structure on the ground, or may be a base station device installed in a mobile body moving on the ground. More specifically, the base station device 20 may be an antenna installed in a structure such as a building and a signal processing device connected to the antenna. It is a matter of course that the base station device 20 may be a structure or a mobile body itself. The phrase "on the ground" not only means on land (on the ground in a narrow sense), but also means in the ground, on the water, and underwater in a broad sense. Note that the base station device 20 is not limited to the ground base station device. The base station device 20 may be a non-ground base station device (non-ground station device) capable of floating in the air or space. For example, the base station device 20 may be an aircraft station device or a satellite station device.

The aircraft station device is a wireless communication device capable of floating in the atmosphere, such as an aircraft. The aircraft station device may be a device mounted on an aircraft or the like, or may be the aircraft itself. Note that the concept of the aircraft includes not only a heavy aircraft such as an airplane or a glider, but also a light aircraft such as a balloon or an airship. Further, the concept of the aircraft includes not only the heavy aircraft and the light aircraft, but also a rotary-wing aircraft such as a helicopter or an autogyro. Note that the aircraft station device (or the aircraft on which the aircraft station device is mounted) may be an unmanned aerial vehicle such as a drone.

Note that the concept of the unmanned aerial vehicle also includes an unmanned aircraft system (UAS) and a tethered UAS. The concept of the unmanned aerial vehicle also includes a Lighter than Air UAS (LTA) and a Heavier than Air UAS (HTA). In addition, the concept of the unmanned aerial vehicle also includes high altitude UAS platforms (HAPs).

The satellite station device is a wireless communication device capable of floating outside the atmosphere. The satellite station device may be a device mounted on a space mobile body such as an artificial satellite, or may be the space mobile body itself. A satellite that serves as the satellite station device may be any one of a low earth orbiting (LEO) satellite, a medium earth orbiting (MEO) satellite, a geostationary earth orbiting (GEO) satellite, or a highly elliptical orbiting (HEO) satellite. It is a matter of course that the satellite station device may be a device mounted on the LEO satellite, the MEO satellite, the GEO satellite, or the HEO satellite.

The size of the coverage of the base station device 20 may be large like a macrocell or may be small like a picocell. It is a matter of course that the size of the coverage of the base station device 20 may be extremely small like a femtocell. Further, the base station device 20 may have a beamforming capability. In this case, the base station device 20 may form a cell or a service area for each beam.

In the example of FIG. 8, the base station device 20$_1$ is connected to the relay device 30$_1$, and the base station device 20$_2$ is connected to the relay device 30$_2$. The base station device 20$_1$ can indirectly perform wireless communication with the terminal device 40 via the relay device 30$_1$. Similarly, the base station device 20$_2$ can indirectly perform wireless communication with the terminal device 40 via the relay device 30$_2$.

Note that the base station may include a set of a plurality of physical or logical devices. For example, in an embodiment of the present disclosure, the base station is classified into a plurality of devices including a baseband unit (BBU) and a radio unit (RU), and may be interpreted as a set of these plurality of devices. In addition or instead, in an embodiment of the present disclosure, the base station may be either or both of the BBU and the RU. The BBU and the RU may be connected by a predetermined interface (for example, eCPRI). In addition or instead, the RU may be referred to as a remote radio unit (RRU) or a Radio DoT (RD). In addition or instead, the RU may correspond to the gNB-DU described below. In addition or instead, the BBU may correspond to the gNB-CU described below. In addition or instead, the RU may be a device integrally formed with an antenna. An antenna of the base station (for example, the antenna integrally formed with the RU) may adopt an advanced antenna system and support MIMO (for example, FD-MIMO) or beamforming. In the advanced antenna system, the antenna of the base station (for example, the antenna integrally formed with the RU) may include, for example, 64 transmission antenna ports and 64 reception antenna ports.

[Relay Device]

The relay device 30 is a device serving as a relay station of a base station. The relay device 30 is a type of base station device. The relay device can be rephrased as a relay base station device (or a relay base station). The relay device 30 can perform NOMA communication with the terminal device 40. The relay device 30 relays communication between the base station device 20 and the terminal device 40. The relay device 30 may be a ground station device or a non-ground station device. The relay device 30 constitutes the radio access network RAN together with the base station device 20.

[Terminal Device]

The terminal device 40 is a wireless communication device that wirelessly communicates with the base station device 20 or the relay device 30. The terminal device 40 is, for example, a mobile phone, a smart device (smartphone or tablet PC), a personal digital assistant (PDA), or a personal computer. Furthermore, the terminal device 40 may be a device such as a business camera having a communication function, or may be a motorcycle, a moving relay vehicle, or the like on which a communication device such as a field pickup unit (FPU) is mounted. Furthermore, the terminal device 40 may be a machine-to-machine (M2M) device or an Internet of Things (IoT) device.

Furthermore, the terminal device 40 may be able to perform sidelink communication with another terminal device 40. The terminal device 40 may be able to use an automatic retransmission technology such as HARQ when performing sidelink communication. Furthermore, the terminal device 40 may be able to perform LPWA communication with another communication device (for example, the base station device 20, the relay device 30, or another terminal device 40). In addition, wireless communication used by the terminal device 40 may be wireless communication using millimeter waves. Note that the wireless communication (including the sidelink communication) used by the terminal device 40 may be wireless communication using radio waves or may be (optical) wireless communication using infrared rays or visible light.

Furthermore, the terminal device 40 may be a mobile device. Here, the mobile device is a movable wireless communication device. Here, the terminal device 40 may be a wireless communication device installed on a mobile body, or may be the mobile body itself. For example, the terminal device 40 may be a vehicle that moves on a road, such as an automobile, a bus, a truck, or a motorcycle, or a wireless communication device mounted on the vehicle. Note that the mobile body may be a mobile terminal, or may be a mobile body that moves on land (on the ground in a narrow sense), in the ground, on water, or under water. Furthermore, the mobile body may be a mobile body that moves inside the atmosphere, such as a drone or a helicopter, or may be a mobile body that moves outside the atmosphere, such as an artificial satellite.

Note that the terminal device 40 is not necessarily a device directly used by a person. The terminal device 40 may be a sensor installed in a machine of a factory like so-called machine type communication (MTC). Furthermore, the terminal device 40 may be a machine-to-machine (M2M) device or an Internet of Things (IoT) device. Furthermore, the terminal device 40 may be a device having a relay communication function as represented by device-to-device (D2D) and vehicle-to-everything (V2X). Further, the terminal device 40 may be a device that is called client premises equipment (CPE) used in a wireless backhaul or the like.

Hereinafter, a configuration of each device constituting the communication system 1 according to an embodiment will be specifically described. Note that the configuration of each device described below is merely an example. The configuration of each device may be different from the following configuration.

2.1. Configuration of Management Device

Figure 9:
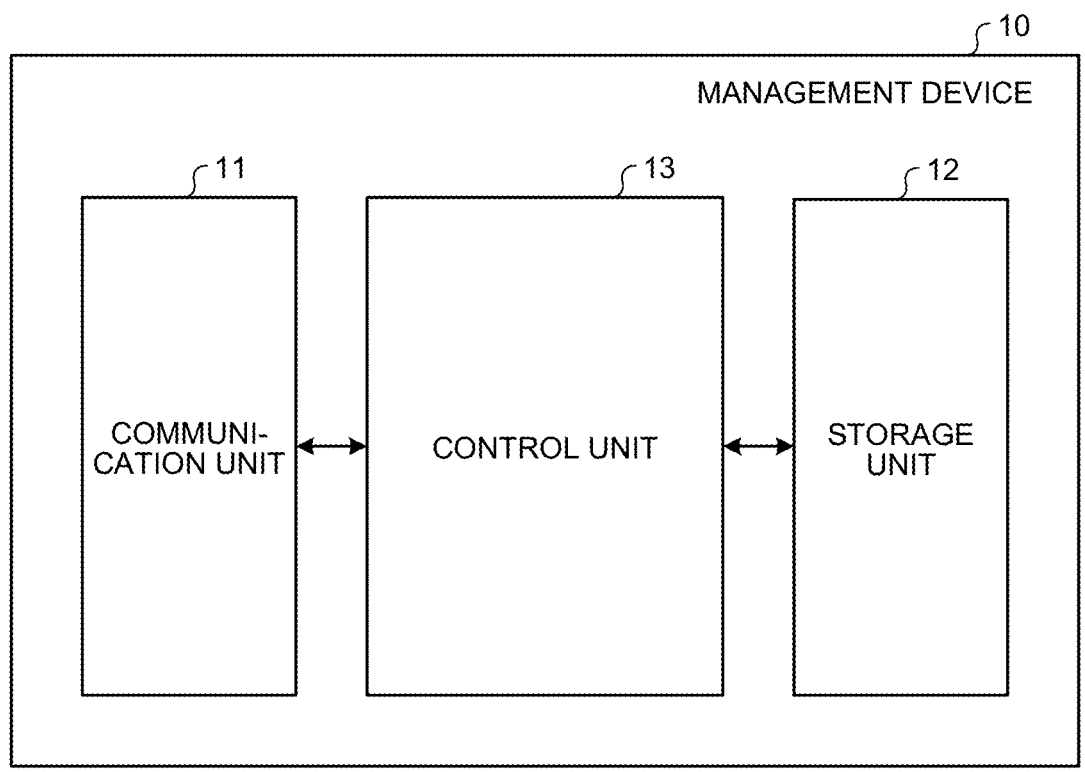
FIG. 9 is a diagram illustrating an example of a configuration of a management device according to an embodiment of the present disclosure.

FIG. 9 is a diagram illustrating an example of a configuration of the management device 10 according to an embodiment of the present disclosure. The management device 10 is a device that manages a wireless network. The management device 10 includes a communication unit 11, a storage unit 12, and a control unit 13. Note that the configuration illustrated in FIG. 9 is a functional configuration, and a hardware configuration may be different from this. Further, the functions of the management device 10 may be distributed to and implemented in a plurality of physically separated components. For example, the management device 10 may be implemented by a plurality of server devices.

The communication unit 11 is a communication interface for performing communication with another device. The communication unit 11 may be a network interface or may be a device connection interface. For example, the communication unit 11 may be a local area network (LAN) interface such as a network interface card (NIC), or may be a universal serial bus (USB) interface including a USB host controller, a USB port, and the like. Further, the communication unit 11 may be a wired interface or a wireless interface. The communication unit 11 functions as communication means of the management device 10. The communication unit 11 performs communication with the base station device 20 under the control of the control unit 13.

The storage unit 12 is a storage device, from which data can be read and in which data can be written, such as a dynamic random access memory (DRAM), a static random access memory (SRAM), a flash memory, or a hard disk. The storage unit 12 functions as storage means of the management device 10. The storage unit 12 stores, for example, a connection state of the terminal device 40. For example, the storage unit 12 stores a radio resource control (RRC) state and an EPS connection management (ECM) state of the terminal device 40. The storage unit 12 may function as a home memory that stores position information of the terminal device 40.

The control unit 13 is a controller that controls each unit of the management device 10. The control unit 13 is implemented by, for example, a processor such as a central processing unit (CPU) or a micro processing unit (MPU). For example, the control unit 13 is implemented in a manner in which the processor executes various programs stored in the storage device inside the management device 10 by using a random access memory (RAM) or the like as a work area. Note that the control unit 13 may be implemented by an integrated circuit such as an application specific integrated circuit (ASIC) or a field programmable gate array (FPGA). The CPU, the MPU, the ASIC, and the FPGA can all be regarded as the controller.

2.2. Configuration of Base Station Device

Figure 10:
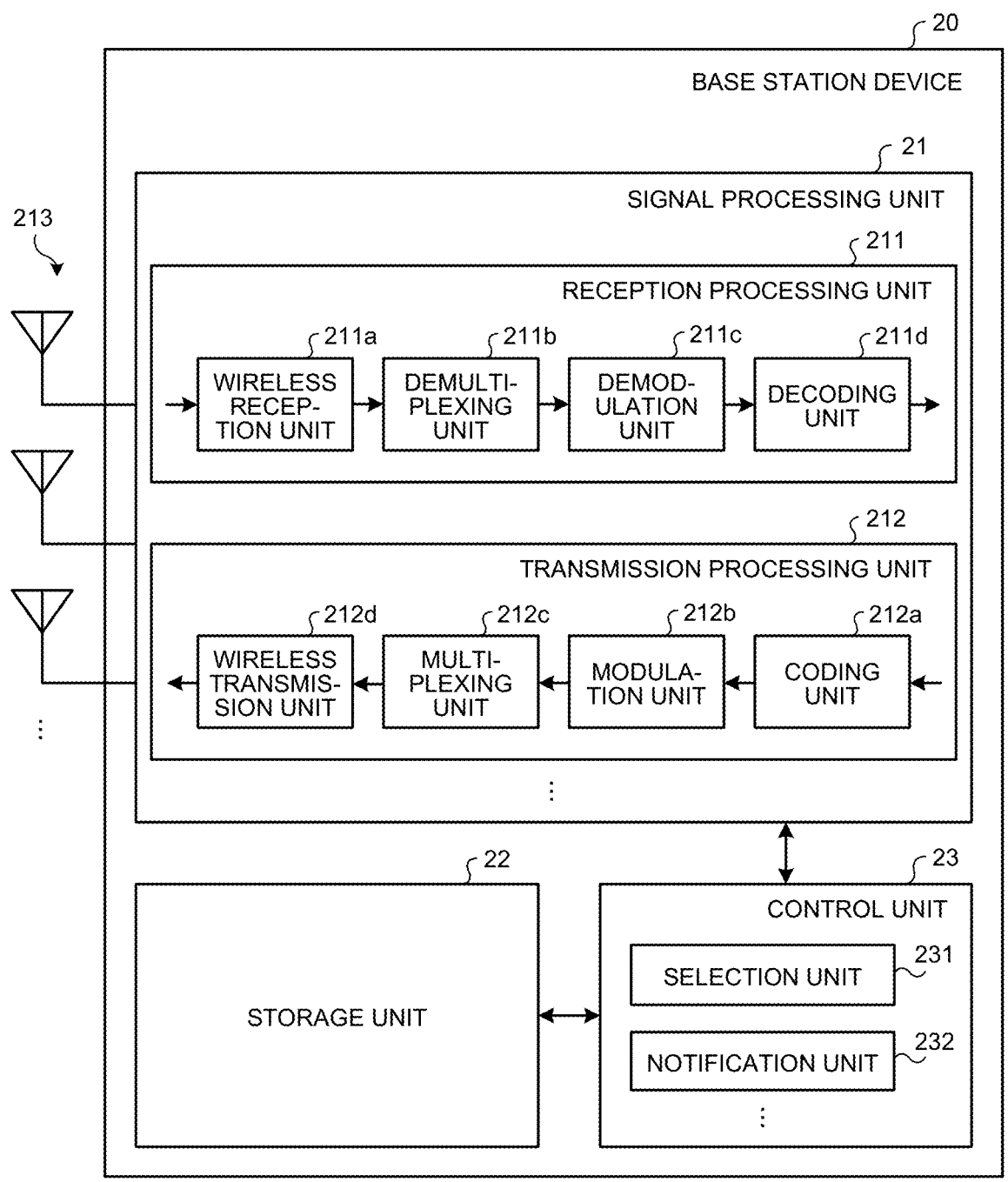
FIG. 10 is a diagram illustrating an example of a configuration of a base station device according to an embodiment of the present disclosure.

Next, the configuration of the base station device will be described. FIG. 10 is a diagram illustrating an example of the configuration of the base station device 20 according to an embodiment of the present disclosure. The base station device 20 includes a signal processing unit 21, a storage unit 22, and a control unit 23. Note that the configuration illustrated in FIG. 10 is a functional configuration, and a hardware configuration may be different from this. Further, the functions of the base station device 20 may be distributed to and implemented in a plurality of physically separated components.

The signal processing unit 21 is a signal processing unit for wirelessly communicating with another wireless communication device (for example, the terminal device 40 or the relay device 30). The signal processing unit 21 is operated under the control of the control unit 23. The signal processing unit 21 supports one or more radio access schemes. For example, the signal processing unit 21 supports both NR and LTE. The signal processing unit 21 may support W-CDMA or cdma2000 in addition to NR or LTE.

The signal processing unit 21 includes a reception processing unit 211, a transmission processing unit 212, and an antenna 213. The signal processing unit 21 may include a plurality of reception processing units 211, a plurality of transmission processing units 212, and a plurality of antennas 213. Note that, in a case where the signal processing unit 21 supports a plurality of radio access schemes, each unit of the signal processing unit 21 can be individually configured for each radio access scheme. For example, the reception processing unit 211 and the transmission processing unit 212 may be individually configured for each of LTE and NR.

The reception processing unit 211 processes an uplink signal received via the antenna 213. The reception processing unit 211 includes a wireless reception unit 211a, a demultiplexing unit 211b, a demodulation unit 211c, and a decoding unit 211d.

The wireless reception unit 211a performs, on the uplink signal, down-conversion, removal of an unnecessary frequency component, a control of an amplification level, quadrature demodulation, conversion into a digital signal, removal of a guard interval (cyclic prefix), extraction of a frequency domain signal by fast Fourier transform, and the like. The demultiplexing unit 211b separates an uplink channel such as a physical uplink shared channel (PUSCH) or physical uplink control channel (PUCCH) and an uplink reference signal from a signal output from the wireless reception unit 211a. The demodulation unit 211c performs demodulation of a reception signal for a modulation symbol of the uplink channel by using a modulation scheme such as binary phase shift keying (BPSK) or quadrature phase shift keying (QPSK). The modulation scheme used by the demodulation unit 211c may be 16-quadrature amplitude modulation (QAM), 64-QAM, or 256-QAM. In this case, signal points on constellation do not necessarily have to be equidistant. The constellation may be non-uniform constellation (NUC). The decoding unit 211d performs decoding processing on a coded bit of the demodulated uplink channel. The decoding unit 211d performs one of the conventional error correction decoding processing (hereinafter, also referred to as first error correction decoding processing) described with reference to FIGS. 1 to 6 and the error correction decoding processing (hereinafter, also referred to as second error correction decoding processing) according to the present embodiment described with reference to FIG. 7. Decoded uplink data and uplink control information are output to the control unit 23.

The transmission processing unit 212 performs transmission processing of downlink control information and downlink data. The transmission processing unit 212 includes a coding unit 212a, a modulation unit 212b, a multiplexing unit 212c, and a wireless transmission unit 212d.

The coding unit 212a codes the downlink control information and the downlink data input from the control unit 23 by using a coding method such as block coding, convolutional coding, or turbo coding. Further, the coding unit 212a performs one of the conventional error correction coding processing (hereinafter, also referred to as first error correction coding processing) described with reference to FIGS. 1 to 6 and the error correction coding processing (hereinafter, also referred to as second error correction coding processing) according to the present embodiment described with reference to FIG. 7. The modulation unit 212b modulates the coded bit output from the coding unit 212a by a predetermined modulation scheme such as BPSK, QPSK, 16-QAM, 64-QAM, or 256-QAM. In this case, signal points on constellation do not necessarily have to be equidistant. The constellation may be non-uniform constellation. The multiplexing unit 212c multiplexes a modulation symbol of each channel and a downlink reference signal, and maps them to a predetermined resource element. The wireless transmission unit 212d performs various kinds of signal processing on a signal from the multiplexing unit 212c. For example, the wireless transmission unit 212d performs processing such as conversion into the time domain by fast Fourier transform, addition of a guard interval (cyclic prefix), generation of a baseband digital signal, conversion into an analog signal, quadrature modulation, up-conversion, removal of extra frequency components, or power amplification. A signal generated by the transmission processing unit 212 is transmitted from the antenna 213.

The storage unit 22 is a storage device, from which data can be read and in which data can be written, such as a DRAM, an SRAM, a flash memory, or a hard disk. The storage unit 22 functions as storage means of the base station device 20.

The control unit 23 is a controller that controls each unit of the base station device 20. The control unit 23 is implemented by, for example, a processor such as a CPU or an MPU. For example, the control unit 23 is implemented in a manner in which the processor executes various programs stored in the storage device inside the base station device 20 by using a RAM or the like as a work area. Note that the control unit 23 may be implemented by an integrated circuit such as an ASIC or an FPGA. The CPU, the MPU, the ASIC, and the FPGA can all be regarded as the controller.

As illustrated in FIG. 10, the control unit 23 includes a selection unit 231 and a notification unit 232. The respective blocks (the selection unit 231 and the notification unit 232) included in the control unit 23 are functional blocks indicating the respective functions of the control unit 23. These functional blocks may be software blocks or hardware blocks. For example, each of the above-described functional blocks may be one software module implemented by software (including a microprogram) or may be one circuit block on a semiconductor chip (die). It is a matter of course that each functional block may be one processor or one integrated circuit. A method of configuring the functional block is arbitrary.

Note that the control unit 23 may be configured with a functional unit different from the above-described functional block. The operation of each block (the selection unit 231 and the notification unit 232) included in the control unit 23 will be described later. Note that the operation of each block included in the control unit 23 may be similar to the operation of each block included in the control unit of the terminal device 40. The configuration of the terminal device 40 will be described later.

2.3. Configuration of Relay Device

Figure 11:
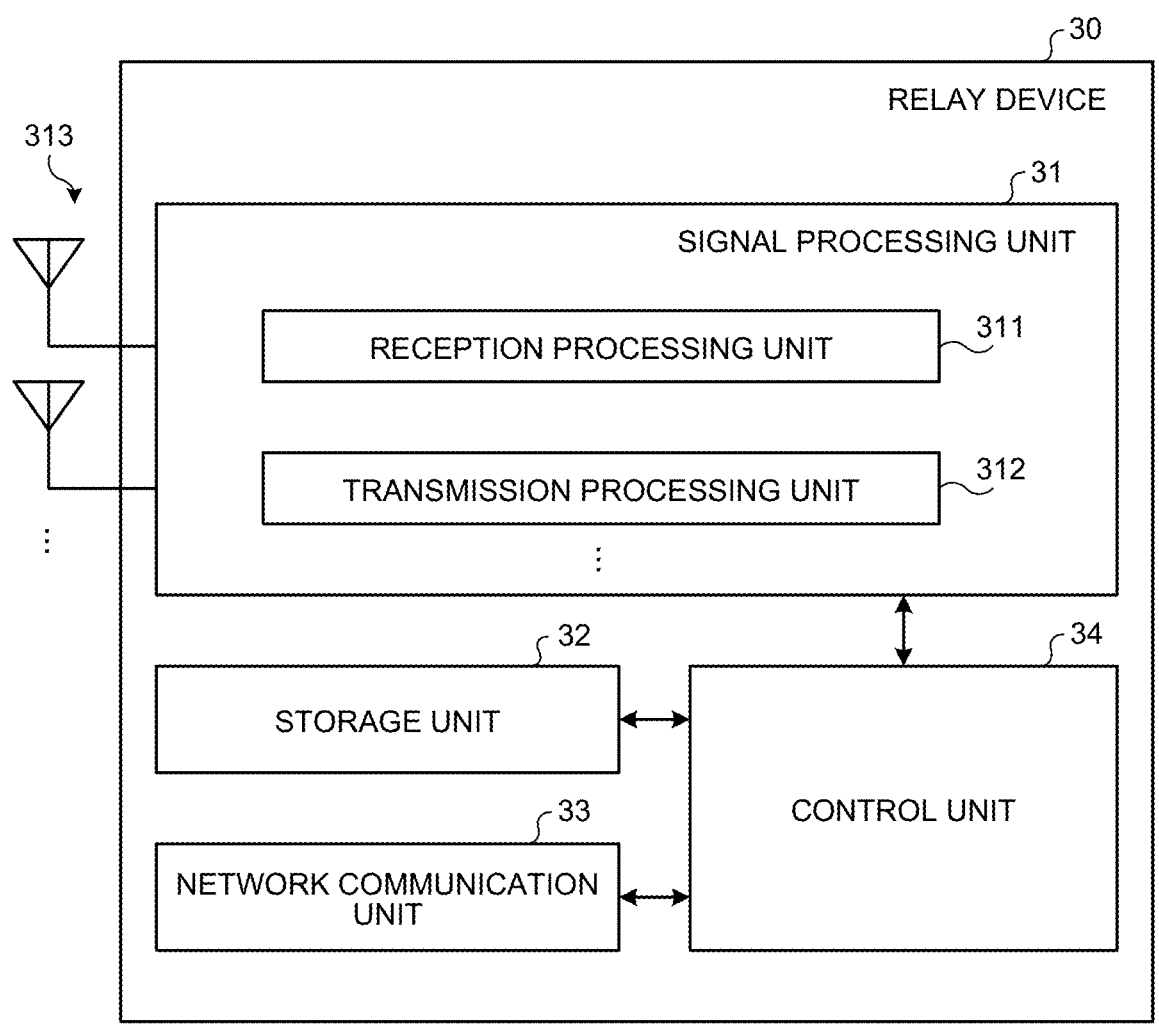
FIG. 11 is a diagram illustrating an example of a configuration of a relay device according to an embodiment of the present disclosure.

Next, the configuration of the relay device 30 will be described. FIG. 11 is a diagram illustrating an example of the configuration of the relay device 30 according to an embodiment of the present disclosure. The relay device 30 includes a signal processing unit 31, a storage unit 32, a network communication unit 33, and a control unit 34. Note that the configuration illustrated in FIG. 11 is a functional configuration, and a hardware configuration may be different from this. Further, the functions of the relay device 30 may be distributed to and implemented in a plurality of physically separated components.

The signal processing unit 31 is a signal processing unit for wirelessly communicating with another wireless communication device (for example, the base station device 20 or the terminal device 40). The signal processing unit 31 is operated under the control of the control unit 34. The signal processing unit 31 includes a reception processing unit 311, a transmission processing unit 312, and an antenna 313. The configurations of the signal processing unit 31, the reception processing unit 311, the transmission processing unit 312, and the antenna 313 are similar to those of the signal processing unit 21, the reception processing unit 211, the transmission processing unit 212, and the antenna 213 of the base station device 20.

The storage unit 32 is a storage device, from which data can be read and in which data can be written, such as a DRAM, an SRAM, a flash memory, or a hard disk.

The network communication unit 33 is a communication interface for performing communication with another device. For example, the network communication unit 33 is a LAN interface such as an NIC. Further, the network communication unit 33 may be a wired interface or a wireless interface. The network communication unit 33 functions as network communication means of the relay device 30. The network communication unit 33 performs communication with the base station device 20 under the control of the control unit 34.

The control unit 34 is a controller that controls each unit of the relay device 30. The configuration of the control unit 34 may be similar to that of the control unit 23 of the base station device 20.

2.4. Configuration of Terminal Device

Figure 12:
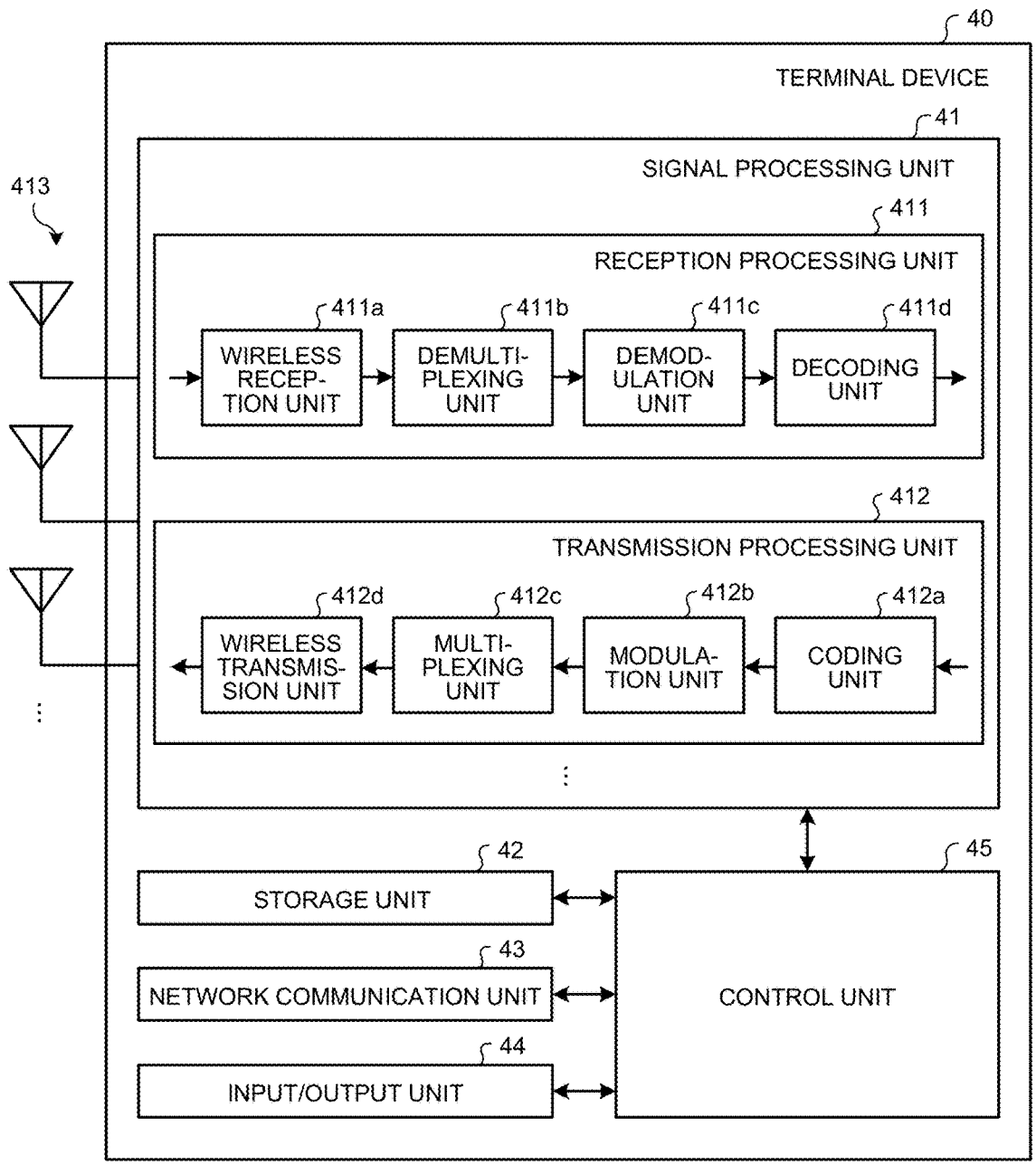
FIG. 12 is a diagram illustrating an example of a configuration of a terminal device according to an embodiment of the present disclosure.

Next, the configuration of the terminal device 40 will be described. FIG. 12 is a diagram illustrating an example of the configuration of the terminal device 40 according to an embodiment of the present disclosure. The terminal device 40 includes a signal processing unit 41, a storage unit 42, a network communication unit 43, an input/output unit 44, and a control unit 45. Note that the configuration illustrated in FIG. 12 is a functional configuration, and a hardware configuration may be different from this. Further, the functions of the terminal device 40 may be distributed to and implemented in a plurality of physically separated components.

The signal processing unit 41 is a signal processing unit for wirelessly communicating with another wireless communication device (for example, the base station device 20 or the relay device 30). The signal processing unit 41 is operated under the control of the control unit 45. The signal processing unit 41 supports one or more radio access schemes. For example, the signal processing unit 41 supports both NR and LTE. The signal processing unit 41 may support W-CDMA or cdma2000 in addition to NR or LTE.

The signal processing unit 41 includes a reception processing unit 411, a transmission processing unit 412, and an antenna 413. The signal processing unit 41 may include a plurality of reception processing units 411, a plurality of transmission processing units 412, and a plurality of antennas 413. Note that, in a case where the signal processing unit 41 supports a plurality of radio access schemes, each unit of the signal processing unit 41 can be individually configured for each radio access scheme. For example, the reception processing unit 411 and the transmission processing unit 412 may be individually configured for each of LTE and NR.

The reception processing unit 411 processes a downlink signal received via the antenna 413. The reception processing unit 411 includes a wireless reception unit 411a, a demultiplexing unit 411b, a demodulation unit 411c, and a decoding unit 411d.

The wireless reception unit 411a performs, on the downlink signal, down-conversion, removal of an unnecessary frequency component, a control of an amplification level, quadrature demodulation, conversion into a digital signal, removal of a guard interval (cyclic prefix), extraction of a frequency domain signal by fast Fourier transform, and the like. The demultiplexing unit 411b separates a downlink channel, a downlink synchronization signal, and a downlink reference signal from the signal output from the wireless reception unit 411a. The downlink channel is, for example, a channel such as a physical broadcast channel (PBCH), a physical downlink shared channel (PDSCH), or a physical downlink control channel (PDCCH). The demodulation unit 211c performs demodulation on the reception signal for a modulation symbol of the downlink channel by using a modulation scheme such as BPSK, QPSK, 16Q-AM, 64-QAM, or 256-QAM. In this case, signal points on constellation do not necessarily have to be equidistant. The constellation may be non-uniform constellation. The decoding unit 411d performs decoding processing on a coded bit of the demodulated downlink channel. The decoding unit 411d performs one of the first error correction decoding processing and the error correction decoding processing. Decoded downlink data and downlink control information are output to the control unit 45.

The transmission processing unit 412 performs transmission processing of uplink control information and uplink data. The transmission processing unit 412 includes a coding unit 412a, a modulation unit 412b, a multiplexing unit 412c, and a wireless transmission unit 412d.

The coding unit 412a codes the uplink control information and the uplink data input from the control unit 45 by using a coding method such as block coding, convolutional coding, or turbo coding. Further, the coding unit 412a performs one of the first error correction coding processing and the second error correction coding processing. The modulation unit 412b modulates the coded bit output from the coding unit 412a by a predetermined modulation scheme such as BPSK, QPSK, 16-QAM, 64-QAM, or 256-QAM. In this case, signal points on constellation do not necessarily have to be equidistant. The constellation may be non-uniform constellation. The multiplexing unit 412c multiplexes a modulation symbol of each channel and an uplink reference signal, and maps them to a predetermined resource element. The wireless transmission unit 412d performs various kinds of signal processing on a signal from the multiplexing unit 412c. For example, the wireless transmission unit 412d performs processing such as conversion into the time domain by inverse fast Fourier transform, addition of a guard interval (cyclic prefix), generation of a baseband digital signal, conversion into an analog signal, quadrature modulation, up-conversion, removal of extra frequency components, or power amplification. A signal generated by the transmission processing unit 412 is transmitted from the antenna 413.

The storage unit 42 is a storage device, from which data can be read and in which data can be written, such as a DRAM, an SRAM, a flash memory, or a hard disk. The storage unit 42 functions as storage means of the terminal device 40.

The network communication unit 43 is a communication interface for performing communication with another device. For example, the network communication unit 43 is a LAN interface such as an NIC. Further, the network communication unit 43 may be a wired interface or a wireless interface. The network communication unit 43 functions as network communication means of the terminal device 40. The network communication unit 43 performs communication with another device under the control of the control unit 45.

The input/output unit 44 is a user interface for exchanging information with the user. For example, the input/output unit 44 is an operation device for the user to perform various operations, such as a keyboard, a mouse, an operation key, or a touch panel. Alternatively, the input/output unit 44 is a display device such as a liquid crystal display or an organic electroluminescence (EL) display. The input/output unit 44 may be an audio device such as a speaker or a buzzer. Further, the input/output unit 44 may be a lighting device such as a light emitting diode (LED) lamp. The input/output unit 44 functions as input/output means (input means, output means, operation means, or notification means) of the terminal device 40.

The control unit 45 is a controller that controls each unit of the terminal device 40. The control unit 45 is implemented by, for example, a processor such as a CPU or an MPU. For example, the control unit 45 is implemented in a manner in which the processor executes various programs stored in the storage device inside the terminal device 40 by using a RAM or the like as a work area. Note that the control unit 45 may be implemented by an integrated circuit such as an ASIC or a FPGA. The CPU, the MPU, the ASIC, and the FPGA can all be regarded as the controller.

3. ERROR CORRECTION PROCESSING

Next, details of the error correction processing according to an embodiment of the present disclosure will be described. The error correction processing according to an embodiment of the present disclosure includes the second error correction coding processing on the transmission side and the second error correction decoding processing on the reception side. Note that the error correction processing (coding processing) described later or described above may be performed with different parameters and configurations for each cell (for example, PCell or SCell), for each BWP, for each terminal, or for each frequency range (FR), or may be performed partially or entirely with the same parameter and configuration. The parameters and configurations for each cell (for example, PCell or SCell), for each BWP, for each terminal, or for each frequency range (FR) may be transmitted as configuration information from the base station to the terminal. The configuration information may be transmitted to the terminal by dynamic notification (for example, MAC CE or DCI), static notification (for example, RRC signaling), or a combination thereof.

3.1. Error Correction Coding Processing

First, the error correction coding processing (second error correction coding processing) according to an embodiment of the present disclosure will be described. The error correction coding processing according to an embodiment of the present disclosure is performed by the coding units $212a$ and $412a$ (an example of a redundant data generation unit) of the base station device 20 and the terminal device 40 described above. Hereinafter, the base station device 20 and the terminal device 40 that perform the second error correction coding processing are also referred to as the transmitters.

The transmitter transmits the second transmission data (an example of second data) to the receiver by using the first transmission data (an example of first data) previously transmitted to the receiver. That is, the second transmission data is transmission target data that the transmitter desires to transmit this time. Note that it is assumed that the first transmission data is subjected to the first error correction coding processing described with reference to FIGS. 1 to 6 and transmitted to the receiver, and a detailed description thereof will be omitted here. In addition, the second transmission data here is data acquired by the transmitter performing the procedures 1) to 5) of the first error correction coding processing described with reference to FIGS. 1 to 6, and corresponds to a CB bit sequence to which the CRC bit is added.

Figure 13:
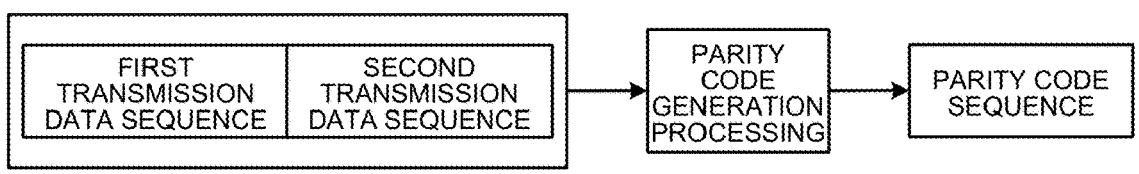
FIG. 13 is a diagram for explaining parity code generation processing according to an embodiment of the present disclosure.

FIG. 13 is a diagram for explaining the parity code generation processing according to an embodiment of the present disclosure. As illustrated in FIG. 13, the transmitter first combines the second transmission data sequence to be transmitted this time and the first transmission data sequence to generate an input data sequence (an example of a combined data sequence).

In FIG. 13, the input data sequence is generated by combining the second transmission data sequence behind the first transmission data sequence, but a method of combining the first transmission data sequence and the second transmission data sequence is not limited thereto. For example, the first transmission data sequence may be combined behind the second transmission data sequence, or bits of the first transmission data sequence and bits of the second transmission data sequence may be alternately arranged and combined. Alternatively, after the first transmission data sequence and the second transmission data sequence are combined, interleaving processing may be performed, or scrambling processing may be performed.

Next, the transmitter performs the parity code generation processing on the generated input data sequence to generate the parity code sequence. Note that the parity code generation processing is performed with the same procedure as the procedure 6) of the first error correction coding processing described above except that the transmission data sequence c is replaced with the input data sequence, and thus a detailed description thereof will be omitted.

Note that the size of the parity code generated in the parity code generation processing according to the present embodiment is larger than the size of the parity code generated in the first error correction coding processing. This is because the size of the input data sequence is larger than that in a case of the first error correction coding processing, and the size of the base graph is larger. However, even in a case where the size of the parity code increases, the size of a transmission signal data sequence to be actually transmitted is adjusted by the rate matching as described in the procedure 7) of the first error correction coding processing. Therefore, the size of the transmission signal data sequence is the same as that in a case of the first error correction coding processing.

Figure 14:
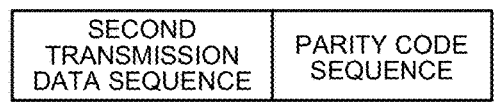
FIG. 14 is a diagram illustrating an example of a transmission signal data sequence according to an embodiment of the present disclosure.

The transmitter adds the generated parity code sequence to the second transmission data sequence to generate the transmission signal data sequence. FIG. 14 is a diagram illustrating an example of the transmission signal data sequence according to an embodiment of the present disclosure. FIG. 14 illustrates an example in which the parity code sequence is added behind the second transmission data sequence.

Note that a method of adding the parity code sequence to the second transmission data sequence is not limited thereto. For example, the second transmission data sequence may be combined behind the parity code sequence, or bits of the second transmission data sequence and bits of the parity code sequence may be alternately arranged and combined. Alternatively, after the second transmission data sequence and the parity code sequence are combined, interleaving processing may be performed, or scrambling processing may be performed.

Since the subsequent processing is the same as the procedures 7) to 9) of the first error correction coding processing described above, a description thereof will be omitted.

The generated transmission signal data sequence is converted into a transmission signal by a processing unit (for example, the modulation units $212b$ and $412b$ and the multiplexing units $212c$ and $412c$, which are examples of a signal generation unit) on a downstream side of the transmission processing units 212 and 412, and is transmitted to the receiver by the wireless transmission units $212d$ and $412d$ (examples of a transmission unit).

3.2. Error Correction Decoding Processing

Next, the error correction decoding processing (second error correction decoding processing) according to an embodiment of the present disclosure will be described. The error correction decoding processing according to an embodiment of the present disclosure is performed by the decoding units $211d$ and $411d$ of the base station device 20 and the terminal device 40 described above. Hereinafter, the base station device 20 and the terminal device 40 that perform the second error correction coding processing are also referred to as the transmitters.

The receiver decodes the reception signal by using the first transmission data (an example of the first data) received in advance. Note that the first transmission data is decoded by performing the first error correction decoding processing described with reference to FIGS. 1 to 6, and thus a detailed description thereof will be omitted here. In addition, the reception signal here is a signal data sequence subjected to the procedure 1) of the error correction decoding processing described above.

Figure 15:
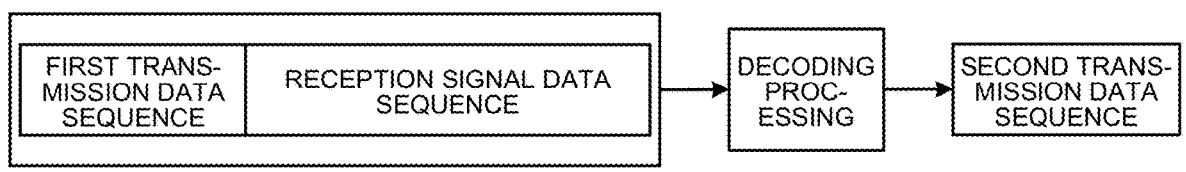
FIG. 15 is a diagram for explaining decoding processing according to an embodiment of the present disclosure.

FIG. 15 is a diagram for explaining the decoding processing according to an embodiment of the present disclosure. As illustrated in FIG. 15, the receiver first generates the input data sequence by combining the reception signal (reception signal data sequence) and the first transmission data sequence (first transmission data sequence already decoded at the time of receiving the reception signal data sequence). In FIG. 15, the input data sequence is generated by combining the reception signal data sequence behind the first transmission data sequence, but the present invention is not limited thereto. It is sufficient if a method of combining the reception signal data sequence and the first transmission data sequence is the same as the method of combining the first transmission data sequence and the second transmission data sequence by the transmitter, and various combination methods may be adopted as described above.

Next, the receiver performs the decoding processing on the generated input data sequence to generate the second transmission data sequence. Note that the decoding processing is performed with the same procedure as the procedure 2) of the first error correction decoding processing described above except that the reception signal is replaced with the input data sequence, and thus a detailed description thereof will be omitted.

Since the subsequent processing is the same as the procedure 3) of the first error correction decoding processing described above, a description thereof will be omitted.

3.3. Flow of Processing

Here, flows of the second error correction coding processing and the second error correction decoding processing described above will be described.
(Second Error Correction Coding Processing)

Figure 16:
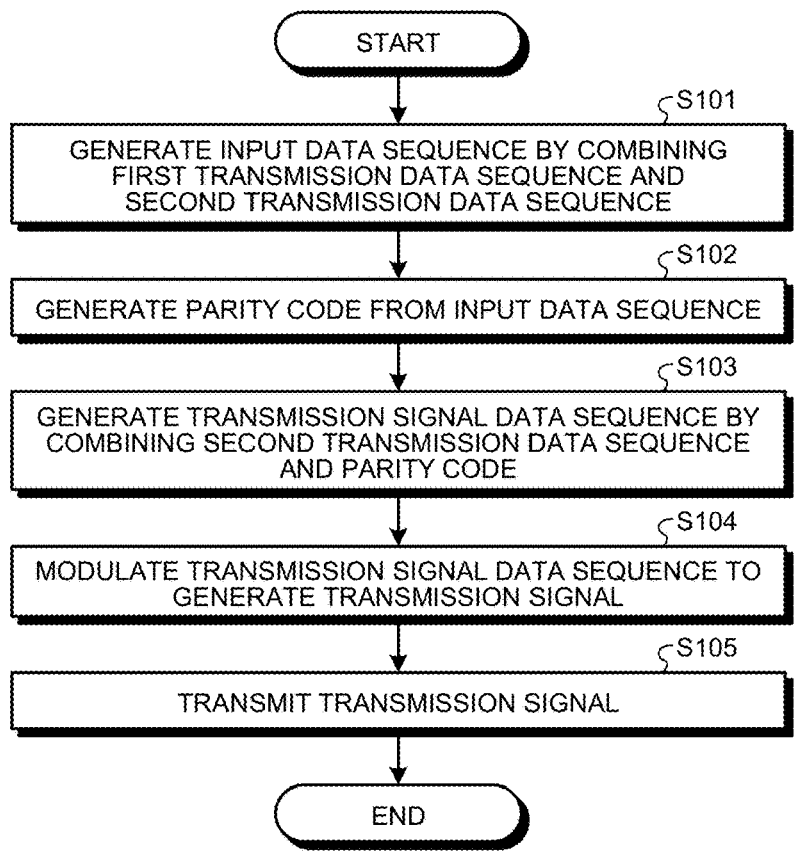
FIG. 16 is a flowchart illustrating an example of error correction coding processing according to an embodiment of the present disclosure.

FIG. 16 is a flowchart illustrating an example of error correction coding processing according to an embodiment of the present disclosure.

As illustrated in FIG. 16, the transmitter first generates the input data sequence by combining the first transmission data sequence and the second transmission data sequence (Step S101). Next, the transmitter generates the parity code from the generated input data sequence (Step S102).

The transmitter combines the second transmission data sequence and the parity code to generate the transmission signal data sequence (Step S103).

The transmitter modulates, for example, the transmission signal data sequence to generate the transmission signal (Step S104) and transmits the transmission signal (Step S105).
(Second Error Correction Decoding Processing)

Figure 17:
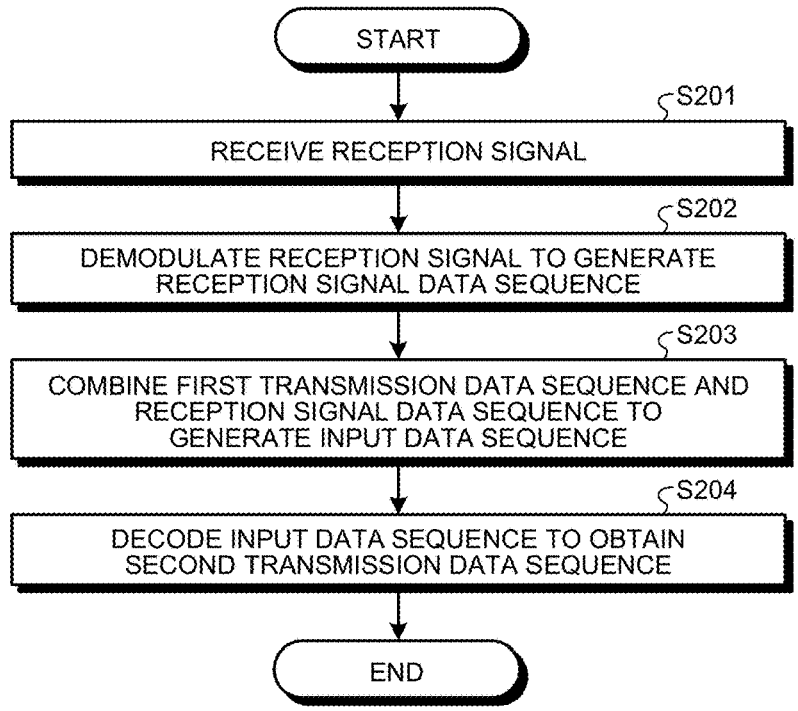
FIG. 17 is a flowchart illustrating an example of error correction decoding processing according to an embodiment of the present disclosure.

FIG. 17 is a flowchart illustrating an example of the error correction decoding processing according to an embodiment of the present disclosure.

As illustrated in FIG. 17, the receiver receives the reception signal (Step S201), and demodulates, for example, the reception signal to generate the reception signal data sequence (Step S202).

The receiver generates the input data sequence by combining the first transmission data sequence and the reception signal data sequence (Step S203). The receiver decodes the generated input data sequence to obtain the second transmission data sequence (Step S204).

3.4. Effects

As described above, the first transmission data sequence is data (known data) already decoded by the receiver, and the signal sequence has high reliability. Since the transmitter also uses such a first transmission data sequence to generate the parity code sequence, the receiver can use a known data sequence with high reliability for decoding the reception signal.

For example, in the decoding processing performed by the receiver, means for performing decoding using the log-likelihood ratio (LLR) as described above is conceivable. In the decoding processing according to the present embodiment, the first transmission data sequence is combined with the reception signal data sequence, and the reliability of the LLR corresponding to the first transmission data sequence is higher than that of the reception signal data sequence. Therefore, the receiver can use the LLR value of the first transmission data sequence that has already been decoded and has high reliability for decoding.

FIGS. 18 and 19 are diagrams for explaining the error correction processing according to the present embodiment. FIG. 18 illustrates an example of generating the parity code sequence from the first transmission data sequence and the second transmission data sequence. FIG. 19 illustrates an example of decoding the transmission data sequence from the parity code sequence.

As illustrated in FIG. 18, in a case where a parity bit A of the parity code sequence is generated from the input data sequence obtained by combining the first transmission data sequence and the second transmission data sequence, the transmitter generates the parity bit A from, for example, three data bits of the input data sequence. In this case, the parity bit A includes, for example, information of two data bits of the first transmission data sequence and one data bit of the second transmission data sequence.

Further, in a case where a parity bit B of the parity code sequence is generated from the input data sequence, the receiver generates the parity bit B from, for example, two data bits of the input data sequence. In this case, the parity bit B includes, for example, information of one data bit of the first transmission data sequence and one data bit of the second transmission data sequence.

Next, a case where the receiver updates the LLR value of the reception signal data sequence as the decoding processing will be described. As described above, the transmitter generates the transmission signal by combining the second transmission data sequence and the parity code sequence. Therefore, the reception signal data sequence received by the receiver includes the second transmission data sequence and the parity code sequence as illustrated in FIG. 19.

The receiver generates the input data sequence by combining the first transmission data sequence with the reception signal data sequence, and updates the LLR value of the input data sequence. For example, in FIG. 19, the receiver updates the LLR values of three data bits from the parity bit A. The parity bit A includes, for example, information of two data bits of the first transmission data sequence and one data bit of the second transmission data sequence. Therefore, the receiver updates the LLR values of, for example, two data bits of the first transmission data sequence and one data bit of the second transmission data sequence. Note that, in FIG. 19, the receiver updates the LLR value of the first transmission data sequence, but since the first transmission data sequence is a known signal sequence (already decoded signal sequence), the reliability of the LLR value is high. Therefore, updating of the LLR value of the first transmission data sequence may be omitted. Similarly, the receiver updates the LLR values of three data bits from the parity bit B.

Next, the receiver updates the LLR value of the parity code sequence from the input data sequence. For example, in FIG. 19, the receiver updates the LLR value of parity bit A from three data bits. The parity bit A includes, for example, information of two data bits of the first transmission data sequence and one data bit of the second transmission data sequence. Therefore, the receiver updates the LLR value of the parity bit A by using, for example, two data bits of the first transmission data sequence and one data bit of the second transmission data sequence.

As described above, in a case where the LLR value is updated, the LLR value of the input data sequence can be updated using the LLR value with high reliability.

For example, in a case where the belief propagation (BP) algorithm used in the LDPC decoding is considered as described above, the LLR value with high reliability can be reflected to the values of other columns by the row processing.

Figure 20:
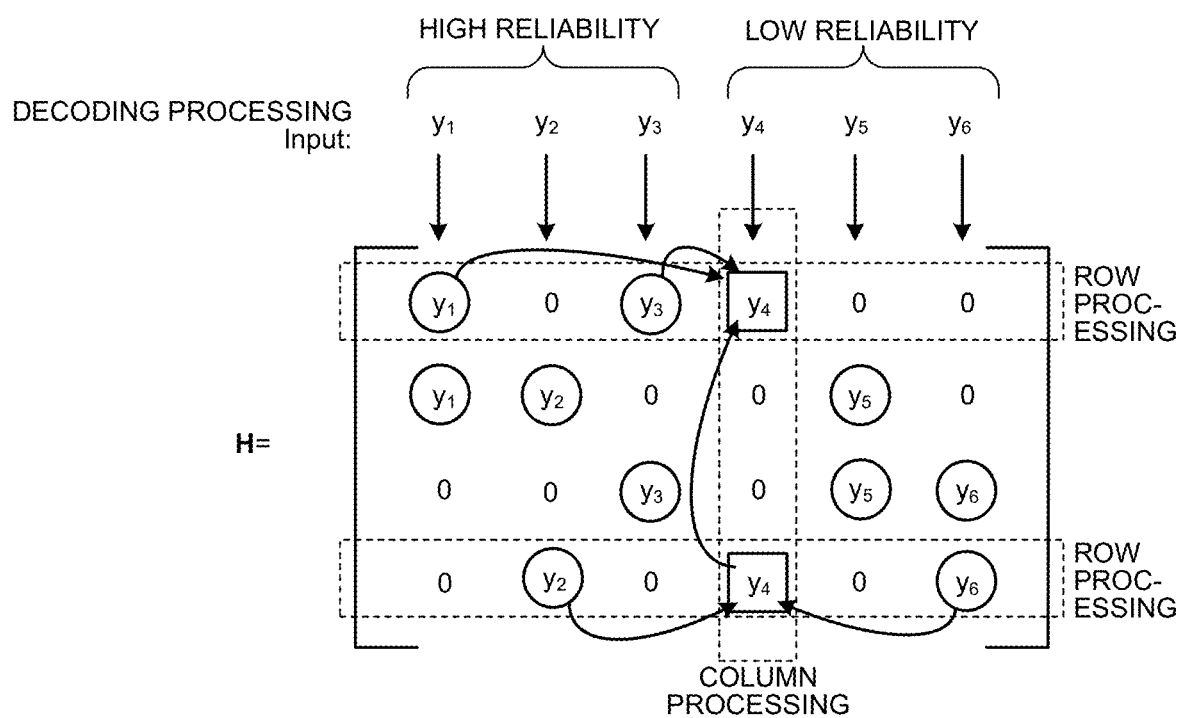
FIG. 20 is a diagram for explaining error correction decoding processing according to an embodiment of the present disclosure.

FIG. 20 is a diagram for explaining the error correction decoding processing according to an embodiment of the present disclosure. As illustrated in FIG. 20, inputs (input data sequence) of the decoding processing performed by the receiver are $y_1$ to $y_6$. $y_1$ to $y_3$ are, for example, the LLRs of the first transmission data sequence, and have values with higher reliability than $y_4$ to $y_6$. $y_4$ to $y_6$ are, for example, the LLRs of the reception signal data sequence, and have values with lower reliability than $y_1$ to $y_3$.

For example, a case where $y_4$ among $y_1$ to $y_6$ as described above is decoded will be described. In this case, the receiver first reflects the LLR values of the columns other than $y_4$ in the column of $y_4$ by the row processing. Thereafter, the receiver adds the updated $y_4$ by the column processing to update the LLR value of $y_4$. At this time, as illustrated in FIG. 20, since there is an LLR value with high reliability, it is possible to update an LLR value with low reliability to be more reliable.

As the receiver repeatedly performs the row processing and the column processing, it is possible to update the LLR value to a more reliable LLR value. At this time, since the input data sequence includes an LLR value with high reliability, it is possible to obtain a highly reliable LLR value even in a case where the number of repetitions is reduced, and it is possible to achieve not only high reliability but also low processing latency (shortened processing time).

4. NOTIFICATION PROCESSING

Subsequently, notification processing according to an embodiment of the present disclosure will be described. As described above, the base station device 20 and the terminal device 40 (examples of the transmitter and the receiver) according to the present embodiment can perform both the first and second error correction coding processings and the first and second error correction decoding processings. Therefore, the base station device 20 according to the present embodiment notifies the terminal device 40 which one of the first error correction coding processing and the first error correction decoding processing (hereinafter, also referred to as first error correction processing) or the second error correction coding processing and the second error correction decoding processing (hereinafter, also referred to as second error correction processing) is performed, for example.

(Selection of Error Correction Processing)

First, the base station device 20 selects either the first error correction processing or the second error correction processing. Such processing is performed, for example, by the selection unit 231 (see FIG. 10) of the base station device 20.

For example, the base station device 20 acquires information (UE capability) regarding whether or not the terminal device 40 can perform the second error correction processing, and selects the error correction coding processing to be performed based on the information. For example, the base station device 20 selects the second error correction processing in a case where the terminal device 40 can perform the second error correction processing, and selects the first error correction processing in a case where the terminal device 40 cannot perform the second error correction processing.

Alternatively, the base station device 20 may select either the first error correction processing or the second error correction processing according to a service type of the transmission data, for example. For example, the base station device 20 selects the second error correction processing in a case where the transmission data is URLLC, and selects the first error correction processing in a case where the transmission data is eMBB.

More specifically, the base station device 20 selects the second error correction processing in a case where quality of service (QoS) has a predetermined value, and selects the first error correction processing in a case where the QoS has a value other than the predetermined value.

For example, the QoS in 5G NR is defined as a 5G QoS identifier (5QI) described in Table 5.7.4-1 of TS 23.501. As a feature defined as the QoS, a guaranteed bit rate (GBR) or non-GBR, a delay requirement, a packet error rate, a maximum data transfer amount, a service example, or the like is defined as each QoS value (5QI value or the like).

The base station device 20 may select either the first error correction processing or the second error correction processing according to a value of an item defined as the QoS. In this case, for example, in a case of the GBR, the base station device 20 selects the second error correction processing. Alternatively, the base station device 20 may select the second error correction processing in a case where the delay requirement is equal to or less than a predetermined value, or may select the second error correction processing in a case where the packet error rate is equal to or less than a predetermined value.

As described above, since processing latency can be reduced by using the second error correction processing, the base station device 20 may select either the first error correction processing or the second error correction processing according to the delay requirement. In this case, the base station device 20 selects the second error correction processing in a case of the QoS with a high delay requirement such as an augmented reality (AR)/virtual reality (VR) service, real time gaming, factory automation, or vehicle-to-X (V2X).

(Notification)

The base station device 20 notifies the terminal device 40 of notification information including a result of selecting the error correction processing. Such processing is performed, for example, by the notification unit 232 (see FIG. 10) of the base station device 20.

(Notification of Execution Information)

The base station device 20 notifies the terminal device 40 of information regarding processing selected to be performed among the first error correction processing and the second error correction processing. In addition, the base station device 20 may transmit information indicating whether or not the second error correction coding processing has been actually performed on the transmission data. Note that the terminal device 40 may notify the base station device 20 of such information.

(Notification of Data Information)

In addition, the base station device 20 notifies of information indicating which transmission data among the transmitted data is the first transmission data and which data is the second transmission data. In addition, in a case where there are a plurality of pieces of first transmission data and a plurality of pieces of second transmission data, the base station device 20 notifies of information indicating which first transmission data and which second transmission data are to be combined.

The base station device 20 notifies of information regarding a combination order of the first transmission data, the second transmission data, and the parity code sequence. Examples of such information include information indicating in which order the first transmission data and the second transmission data are combined or whether or not interleaving processing or the like is performed.

The base station device 20 notifies of information indicating the length of each of the first transmission data and the second transmission data.

(Notification of Association Information)

Furthermore, as will be described later, in a case where the base station device 20 implicitly notifies of the error correction processing to be performed by associating a specific channel with the error correction processing to be performed, a notification of information indicating which specific channel is associated with which error correction processing may be made.

For example, in a case where a physical channel is associated with the error correction processing or a logical channel and/or a transport channel is associated with the error correction processing, the base station device 20 notifies of information indicating which channel is associated with which error correction processing.

More specifically, in a case where the physical channel is associated with the error correction processing, the base station device 20 transmits data subjected to the second error correction coding processing on a predetermined channel (for example, a data channel such as PDSCH, PUSCH, or PSSCH), and transmits data subjected to the first error correction coding processing on a channel other than the predetermined channel (for example, a control channel such as PDCCH, PUCCH, or PSCCH).

Alternatively, in a case where the logical channel and/or the transport channel is associated with the error correction processing, the base station device 20 transmits data subjected to the second error correction coding processing on, for example, a predetermined channel (for example, a dedicated control channel (DCCH) or a dedicated traffic channel (DTCH)), and transmits data subjected to the first error correction coding processing on a channel other than the predetermined channel.

In this case, the base station device 20 notifies the terminal device 40 of association information indicating that data subjected to the second error correction coding processing is transmitted on a predetermined channel and data subjected to the first error correction coding processing is transmitted on a channel other than the predetermined channel.

In addition, the base station device 20 may associate an antenna port index with the error correction processing. For example, the base station device 20 transmits data subjected to the second error correction coding processing from a predetermined antenna port, and transmits data subjected to the first error correction coding processing from an antenna port other than the predetermined antenna port. In this case, the base station device 20 notifies of association information regarding a correspondence relationship between the antenna port index and the type of the error correction processing.

Alternatively, the base station device 20 may associate a reference signal sequence with the error correction processing. For example, the terminal device 40 receives, for example, a reference signal for channel estimation prior to reception of the transmission data. Therefore, the base station device 20 transmits a reference signal that is a predetermined sequence in a case of transmitting the data subjected to the second error correction coding processing, and transmits a reference signal that is a sequence other than the predetermined sequence in a case of transmitting the data subjected to the first error correction coding processing. As described above, in a case where the reference signal sequence is associated with the error correction processing, the base station device 20 notifies the terminal device 40 of association information indicating, for example, which sequence is a predetermined sequence associated with the error correction processing.

(Notification of Reliability Information)

Furthermore, the base station device 20 notifies of information regarding reliability required for communication. As described above, the base station device 20 selects the error correction processing according to, for example, the QoS. Therefore, the base station device 20 notifies of QoS information as the information regarding reliability, for example.

Note that the information regarding reliability required for communication may be determined in a layer different from a layer in which the error correction processing is performed. For example, in 5G NR, a notification of an identifier indicating the QoS is made in a service data adaptation protocol (SDAP) layer.

(Notification Method)

The base station device 20 notifies of the above-described information (for example, "notification information including a result of selecting the error correction processing", "information regarding processing selected to be performed", "information indicating which data is the second transmission data", "information indicating which first transmission data and which second transmission data are to be combined", "information regarding a combination order of the first transmission data, the second transmission data, and the parity code sequence", "information indicating the length of each of the first transmission data and the second transmission data", "information indicating which specific information channel is associated with which error correction processing", "association information regarding a correspondence relationship between the antenna port index and the type of the error correction processing", and "association information indicating which sequence is a predetermined sequence associated with the error correction processing") by control information such as System Information, RRC signaling, MAC CE, DCI, or UCI, or a combination thereof. For example, information indicating that the first error correction processing is used for PDCCH transmission and the first error correction processing or the second error correction processing is applied to PDSCH transmission may be transmitted by RRC signaling (for example, RRCSetup message, RRCReconfiguration message, or System Information). Further, in this case, information indicating which of the first error correction processing and the second error correction processing is applied to PDSCH transmission may be transmitted on a PDCCH (for example, downlink control information). Similarly, for example, information indicating that the first error correction processing is used for PUCCH transmission and the first error correction processing or the second error correction processing is applied to PUSCH transmission may be transmitted by RRC signaling (for example, RRCSetup message, RRCReconfiguration message, or System Information). Further, in this case, information indicating which of the first error correction processing and the second error correction processing is applied to PUSCH transmission may be transmitted on a PUCCH (for example, uplink control information). Alternatively, in a case where a notification of the association information is made, the base station device 20 notifies of the error correction processing implicitly performed by using predetermined information (for example, a channel, an antenna port, or a reference signal sequence) associated with the error correction processing.

Note that, although the base station device 20 notifies of the association information here, the present invention is not limited thereto. For example, in a case where the association information is determined in advance by a standard or the like, notification of the association information by the base station device 20 may be omitted. Note that, even in a case of information other than the association information, in a case where the information is similarly determined in advance by a standard or the like, notification by the base station device 20 can be omitted.

In addition, here, the error correction processing to be performed is selected by the base station device 20, but the present invention is not limited thereto. For example, the error correction processing to be performed may be selected by the terminal device 40.

Furthermore, here, the base station device 20 notifies of the information regarding the error correction processing, but the present invention is not limited thereto. For example, the terminal device 40 may notify the base station device 20 of at least one piece of information described above.

5. OTHER EMBODIMENTS

In the above-described embodiment, the number of pieces of first transmission data is one, but the present invention is not limited thereto. For example, there may be a plurality of pieces of first transmission data. The transmitter may select one from the plurality of pieces of first transmission data to generate the parity code sequence. Alternatively, the plurality of pieces of first transmission data (divided data) may be combined with the second transmission data to generate the parity code sequence. In this case, the first data includes a plurality of pieces of divided data.

Further, in the above-described embodiment, the first transmission data is transmitted to the receiver before the transmission of the second transmission data, but the present invention is not limited thereto. The first transmission data may be transmitted before or after the second transmission data.

A method of transmitting the first transmission data may be different from a method of transmitting the second transmission data. For example, a subcarrier interval of the first transmission data may be different from a subcarrier interval of the second transmission data. In addition, a transmission time unit (for example, the number of symbols included in a slot) of the first transmission data may be different from a transmission time unit of the second transmission data.

In addition, in the above-described embodiment, an LDPC coding scheme is applied to both the first transmission data and the second transmission data, but the present invention is not limited thereto. Different coding schemes may be applied to the first transmission data and the second transmission data, respectively. For example, a polar coding scheme may be applied to the first transmission data, and the LDPC coding scheme may be applied to the second transmission data.

In addition, in the above-described embodiment, the first transmission data and the second transmission data are different transmission data sequences, but the present invention is not limited thereto. The first transmission data may be received by the receiver in a manner different from that of the second transmission data, for example, one transmission data sequence may be divided into a plurality of CBs, one CB of which may be the first transmission data and another CB may be the second transmission data. In this case, each CB is generated and transmitted as a separate transmission signal.

Note that, in the above-described embodiment, the first data to be combined with the second transmission data is the transmission data, but the present invention is not limited thereto. The first data may be a known signal sequence, and may be, for example, a known signal notified by the system information, RRC signaling, DCI, or the like. Alternatively, the first data may be a value defined in advance by a standard or the like, for example. In addition, the first data may be transmitted to the receiver via a (for example, wired) transmission path different from that of the second transmission data. In addition, the first data may be data calculated based on a predetermined calculation formula. In this case, it is assumed that the transmitter and the receiver store the same calculation formula. The transmitter and the receiver calculate the same first data by calculating the same calculation formula.

In addition, the data size of the first transmission data and/or the data size of the second transmission data may be a predetermined value, and may be changed according to the second transmission data, for example. In a case of changing each data size, the base station device 20 semi-statically or dynamically notifies the terminal device 40 of the changed data size.

In the above-described embodiment, the procedures other than the procedure in which the transmitter generates the input data sequence and the transmission signal data sequence in the second error correction coding processing is the same as the procedures of the first error correction coding processing (for example, the procedures 1) to 5) and 7) to 9) of the first error correction coding processing), but the present invention is not limited thereto. For example, in the second error correction coding processing described above, the base graph is determined from any one of the LDPC base graphs 1 and 2 according to the size and transmission rate of the transmission data sequence (for example, the second transmission data sequence) that the transmitter actually desires to transmit. Instead of this, the transmitter may perform the second error correction coding processing by changing a part of the procedure of the first error correction coding processing, for example, by changing the size of a base graph generation matrix in the procedure 5).

Furthermore, in the above-described embodiment, a case where the parity code sequence is generated as the second error correction processing has been described, but the present invention is not limited thereto. Redundant data used for error correction may be generated, and for example, the transmitter may generate a sequence to be added to the transmission data sequence for use in error correction other than the parity code sequence, such as an error detection bit sequence.

Furthermore, in the above-described embodiment, the transmitter transmits a signal to the receiver by wireless communication, but the present invention is not limited thereto. For example, the transmitter may transmit a signal to the receiver in a wire manner.

6. EXAMPLE OF LDPC CODING PROCESSING

Hereinafter, an example of the LDPC coding processing (for example, second error correction processing) according to an embodiment of the present disclosure will be described with reference to FIGS. 21A to 21D and 22. FIGS. 21A to 21D are diagrams for explaining an example of the parity code generation processing according to an embodiment of the present disclosure. FIG. 22 is a table for extracting parameters used in the LDPC coding processing. The processing illustrated in FIGS. 21A to 21D is performed by, for example, the coding units 212a and 412a of the base station device 20 and the terminal device 40. In addition, the table illustrated in FIG. 22 is used in the processing illustrated in FIGS. 21A to 21D.

Note that a description of the same portions in the processing illustrated in FIGS. 21A to 21D as those of TS 38.212 is omitted.

As illustrated in the first to fourth rows of FIG. 21A, when an input bit sequence 1 (corresponding to the first transmission data sequence) is denoted by Formula (4) and an input bit sequence 2 (corresponding to the second transmission data sequence) is denoted by Formula (5), a combined bit sequence is denoted by Formula (6). Note that it is assumed that $B_1>0$, $B_2>0$, and $B=B_1+B_2$.

[Math. 4]

$$\hat{b}_0, \hat{b}_1, \hat{b}_2, \hat{b}_3, \ldots, \hat{b}_{B_1-1} \quad (4)$$

$$\tilde{b}_0, \tilde{b}_1, \tilde{b}_2, \tilde{b}_3, \ldots, \tilde{b}_{B_2-1} \quad (5)$$

$$b_0, b_1, b_2, b_3, \ldots, b_{B-1} = \hat{b}_0, \hat{b}_1, \hat{b}_2, \hat{b}_3, \ldots, \hat{b}_{B_1-1}, \tilde{b}_0, \tilde{b}_1, \tilde{b}_2, \tilde{b}_3, \ldots, \tilde{b}_{B_2-1} \quad (6)$$

As illustrated in FIG. 21A, if the combined bit sequence B is larger than a maximum code block size K_cb, segmentation of the input bit sequence B is performed. Then, a CRC sequence of L=24 bits is added to each code block. For the LDPC base graph 1, the maximum code block size K_cb is 8448. For the LDPC base graph 2, the maximum code block size K_cb is 3840. Then, the total number of code blocks C is determined as follows. That is, if the bit sequence B is equal to or smaller than the maximum code block size K_cb, L=0, the number C of code blocks is 1, and B'=B. On the other hand, if the bit sequence B is larger than the maximum code block size K_cb, L=24, the number C of code blocks is ceil(B/(K_cb−L)), and B'=B+C·L.

As illustrated in FIG. 21B, a bit sequence output from code block segmentation is denoted by C_r0, C_r1, C_r2, C_r3, . . . , C_r(K_r−1). Here, r is the number of code blocks, and 0≤r<C. In addition, Kr is the number of bits K for the r-th code block.

The number of bits K in each code block is calculated as follows: K'=B'/C.

For the LDPC base graph 1, K_b=22. For the LDPC base graph 2, if the bit sequence B is larger than 640, K_b is 10; otherwise (that is, if B is equal to or smaller than 640), if B is larger than 560, K_b is 9; otherwise (that is, if B is equal to or smaller than 560), if B is larger than 192, K_b is 8; and otherwise (that is, if B is equal to or smaller than 192), K_b is 6. Then, a minimum value Z_c of Z satisfying K_b·Z_c>K' is specified in the column of "Set of lifting sizes (Z)" of the table (Table 5.3.2-1) illustrated in FIG. 22. Note that, for the LDPC base graph 1, K'=22Zc, and for the LDPC base graph 2, K'=10Zc.

Then, as illustrated in FIG. 21C, the bit sequence C_rk is calculated as follows. An initial value of s is set to 0, and if r=0 to C−1 and k=0 to K'−L−1, C_rk=b_s, where s is a value obtained by incrementing the initial value s by 1. If r=0 to C−1 and C is greater than 1, the bit sequence C_r0, C_r1, C_r2, C_r3, . . . , C_r(K'−L−1) is used to calculate the CRC parity bit sequence P_r0, P_r1, P_r2, P_r3, . . . , P_r(L−1). Note that this calculation is performed using a known CRC calculation method (generator g_CRC24B(D) described in Section 5.1 of TS 38.212). Then, for k=K'−L to K'−1, C_rk is P_r(k+L−K'). For r=0 to C−1 and k=K' to K−1 (that is, regarding insertion of filter bits), C_rk is <NULL>.

Then, as illustrated in FIG. 21D, a transmission bit sequence $d_0, d_1, d_2, \ldots, d_{N-1}$ is actually generated from the input bit sequence denoted by $c_0, c_1, \ldots, c_{K-1}$. Here, K indicates the number of bits to be encoded. Specifically, K is the same as the number K_r of bits of C_r0, C_r1, C_r2, C_r3, . . . , C_r(K_r−1) derived in FIG. 21B. A value of N varies depending on whether the LDPC base graph 1 or the LDPC base graph 2 is used. For the LDPC base graph 1, N=66*Z_c. For the LDPC base graph 2, N=50*Z_c. The encoding procedure is as follows.

Specifically, first, an index $i_{LS}$ is extracted from the table illustrated in FIG. 22. The extracted index $i_{LS}$ is is an index $i_{LS}$ is (corresponding to) including Z_c (the minimum value of Z satisfying K_b·Z_c>K') described above. Note that the table illustrated in FIG. 22 is the same as Table 5.3.2-1 of TS 38.212. Next, for k=S_init to K−1, a value of d_k-Sinit varies depending on whether or not c_k is <NULL>. If c_k is not <NULL>, d_k-Sinit has the value of c_k. If c_k is <NULL>, c_k is 0, and d_k-Sinit is <NULL>. Note that, if 2Z_c is equal to or smaller than B1, S_init=B1, otherwise, S_init=2Z_c.

Then, the parity bit sequence w having the number of bits of N+2Z_c−K is generated. The parity bit sequence w is such a bit sequence w that the product of a matrix H and a vector [c, w] becomes a zero matrix. Note that the vector c is a bit sequence c having the number K of bits. The matrix H is a Z_c×Z_c matrix in which the respective elements of the table LDPC base graph $H_{BG}$ illustrated in FIG. 3 are replaced as follows.

An element of value 0 in H BG is replaced by a zero matrix of size Z_c×Z_c.

An element of value 1 in H BG is replaced by a circular permutation matrix I(P_(i, j)) of size Z_c×Z_c. Here, i and j are row and column indexes of each element. In addition, I(P_(i, j)) is obtained by cyclically shifting an identity matrix of size Z_c×Z_c to the right P_(i, j) times. The value of P_(i, j) is given by P_(i, j)=mod(V_(I, j), Z_c). P_(i, j) is obtained from the index $i_{LS}$ and the LDPC base graph obtained above using a predetermined table.

Then, for k=K to the (N+2Z_c−1), d_k−2Zc is w_k−K.

As described above, the parity code sequence can be generated using a bit sequence in which the input bit sequence 1 and the input bit sequence 2 are combined, and the transmission bit sequence can be generated based on the input bit sequence 2 and the parity code sequence.

7. APPLICATION EXAMPLE

In addition, in the selection of the first error correction processing or the second error correction processing based on the delay requirement described above in some embodiments, a requirement of a service (for example, a cloud game) using augmented reality (AR)/virtual reality (VR) may be considered.

In 5G NR (New Radio), several services have been studied as use cases. Among them, the AR/VR services are expected as killer contents of 5G NR. 3GPP TR 22.842 v17.1.0 and TS 22.261 v17.0.1 specify the requirements for rendering a game image for a cloud game using AR/VR. More specifically, these technical specifications and reports describe motion-to-photon latency and motion-to-sound latency as allowable latencies at a level that allows an AR/VR user to feel comfortable with a motion in a video in rendering a game image, as follows.

Motion-to-photon latency: The motion-to-photon latency is in a range of 7 to 15 ms while maintaining a required data rate (1 Gbps).

Motion-to-sound latency: less than 20 ms.

Note that the motion-to-photon latency is defined as latency between a physical motion of the user's head and an updated image in an AR/VR headset (for example, head-mounted display). Also, the motion-to-sound latency is defined as latency between the physical motion of the user's head and updated sound waves that reach the user's ears from a head-mounted speaker. The AR/VR headset and the head-mounted speaker here may be the terminal device 40 in the present invention.

The above technical specifications and reports specify that a 5G system needs to satisfy the following two requirements for rendering in order to satisfy these latency conditions.

Max allowed end-to-end latency: 5 ms (that is, the total allowable latency of uplink and downlink between a terminal (for example, the terminal device 40) and an interface to a data network (for example, a network in which an application function (AF) is arranged) is 5 ms), Service bit rate: user-experienced data rate: 0.1 Gbps (100 Mbps) (that is, a throughput capable of supporting AR/VR contents).

Note that the rendering here includes cloud rendering, edge rendering, or split rendering. In the cloud rendering, AR/VR data is rendered on a cloud of the network (on an entity that is based on core network (including the UPF) deployment that does not consider the location of the user and data network (including the application server and AF) deployment). In the edge rendering, AR/VR data is rendered on an edge of the network (on an entity (for example, an edge computing server (the application server in the data network in network deployment for edge computing) that is based on core network (including the UPF) deployment and data network (including the application server and AF) deployment close to the location of the user). The split rendering means rendering in which a part of the rendering is performed on the cloud and the other part is performed on the edge.

Figure 23:
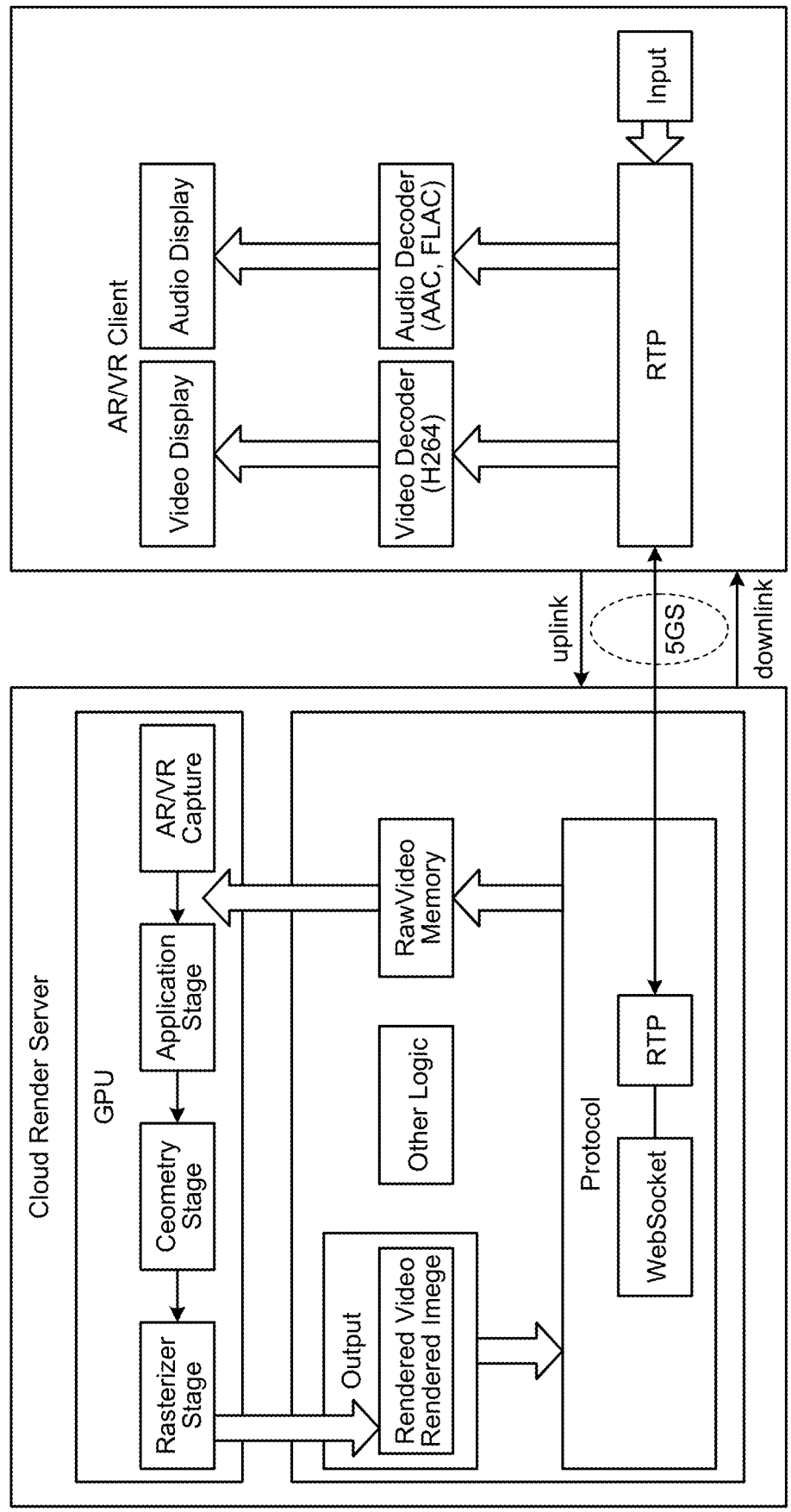
FIG. 23 is a diagram of a rendering server and an AR/VR client related to rendering.

FIG. 23 is a diagram of a rendering server and an AR/VR client related to rendering. FIG. 23 is described in the technical report described above. Here, the AR/VR client may correspond to the terminal device 40 in the present invention. Furthermore, a cloud render server may be an application server (for example, edge computing server) for edge computing in a local area data network (LADN) with a local UPF connected to the base station device 20 in the present invention as an interface. Further, the cloud render server may be referred to as an edge render server or a split render server.

In this application example, for example, in a case of data communication (for example, a session (PDU session), a bearer (radio bearer), and a packet flow (QoS flow)) in which the motion-to-photon latency (7 to 15 ms) or the motion-to-sound latency (less than 20 ms) is required, the above-described second error correction processing may be selected, and in other cases, the above-described first error correction processing may be selected.

In another aspect, the above-described second error correction processing may be selected in a case of data communication (for example, a session (PDU session), a bearer (radio bearer), and a packet flow (QoS flow)) in which the requirement related to rendering, the max allowed end-to-end latency (5 ms), is requested, and the above-described first error correction processing may be selected in other cases.

8. SUPPLEMENTARY DESCRIPTION

As described above, the preferred embodiments of the present disclosure have been described in detail with reference to the accompanying drawings, but the technical scope of the present disclosure is not limited to such examples. It will be apparent to those skilled in the art to which the present disclosure pertains that various modified examples or alterations can be conceived within the scope of the technical idea described in the claims and it is naturally understood that these modified examples or alterations fall within the technical scope of the present disclosure.

Among the respective processing described in the above-described embodiments, all or some of the processing described as being automatically performed can be manually performed. Alternatively, all or some of the processing described as being manually performed can be automatically performed by a known method. In addition, the processing procedures, specific names, information including various data and parameters illustrated in the specification and drawings can be arbitrarily changed unless otherwise specified. For example, various pieces of information illustrated in the drawings are not limited to those illustrated in the drawings.

Further, each illustrated component of each device is functionally conceptual, and does not necessarily have to be configured physically as illustrated in the drawings. That is, the specific modes of distribution/integration of the respective devices are not limited to those illustrated in the drawings. All or some of the devices can be functionally or physically distributed/integrated in any arbitrary unit, depending on various loads or the usage status.

Further, the above-described embodiments can be appropriately combined as long as the processing contents do not contradict each other.

Furthermore, the effects described in the present specification are merely illustrative or exemplary and are not restrictive. That is, the technology according to the present disclosure can exhibit, in addition to or in place of the above-described effects, other effects obvious to those skilled in the art from the description of the present specification.

Note that the following configurations also fall within the technical scope of the present disclosure.

(1)

A communication device comprising:

a redundant data generation unit that performs error correction coding processing on combined data obtained by combining first data and second data and generates redundant data used for error correction;

a signal generation unit that generates a transmission signal based on the second data and the redundant data; and a transmission unit that transmits the transmission signal to another communication device.

(2)

The communication device according to (1), wherein the first data is data to be transmitted to the another communication device.

(3)

The communication device according to (2), wherein the first data is transmitted to the another communication device before the second data.

(4)

The communication device according to (2), wherein the first data is transmitted to the another communication device after the second data.

(5)

The communication device according to any one of (2) to (4), wherein the first data is data transmitted on a control channel, and the second data is data transmitted on a data channel.

(6)

The communication device according to any one of (2) to (5), wherein the first data is transmitted so as to be different from the second data in at least one of a subcarrier interval, a transmission interval, or the error correction coding processing.

(7)

The communication device according to any one of (2) to (6), wherein the first data and the second data are at least one of block data obtained by dividing same transmission data into a plurality of code blocks, and are separately transmitted.

(8)

The communication device according to any one of (2) to (7), wherein the first data is transmitted through a communication path different from a communication path of the second data.

(9)

The communication device according to (1), wherein the first data is known data.

(10)

The communication device according to (1), wherein the first data is calculated based on a predetermined calculation formula.

(11)

The communication device according to any one of (1) to (10), wherein the first data includes a plurality of pieces of divided data.

(12)

The communication device according to any one of (1) to (11), wherein the redundant data generation unit performs the error correction coding processing on the combined data in a case of transmitting the second data on a predetermined channel, and performs the error correction coding processing on the second data in a case of transmitting the second data on a channel other than the predetermined channel.

(13)

The communication device according to any one of (1) to (11), wherein the redundant data generation unit performs the error correction coding processing on the combined data in a case of transmitting the second data with a predetermined service quality, and performs the error correction coding processing on the second data in a case of transmitting the second data with a service quality other than the predetermined service quality.

(14)

The communication device according to any one of (1) to (11), wherein the redundant data generation unit performs the error correction coding processing on the combined data in a case of transmitting the second data from a predetermined antenna port, and performs the error correction coding processing on the second data in a case of transmitting the second data from an antenna port other than the predetermined antenna port.

(15)

A communication device comprising:

a reception unit that receives, as a reception signal, a signal generated based on redundant data generated for use in error correction by performing error correction coding processing on combined data obtained by combining first data and second data, and the second data; and a decoding unit that decodes the reception signal.

(16)

The communication device according to (15), wherein the decoding unit decodes the second data by performing error correction decoding processing on the reception signal by using the first data.

(17)

A communication method comprising:

performing error correction coding processing on combined data obtained by combining first data and second data and generating redundant data used for error correction;

generating a transmission signal based on the second data and the redundant data; and transmitting the transmission signal to another communication device.

(18)

A communication method comprising:

receiving, as a reception signal, a signal generated based on redundant data generated for use in error correction by performing error correction coding processing on combined data obtained by combining first data and second data, and the second data; and decoding the reception signal.

REFERENCE SIGNS LIST

1 COMMUNICATION SYSTEM
20 BASE STATION DEVICE
40 TERMINAL DEVICE
211$d$, 411$d$ DECODING UNIT
212$a$, 412$a$ CODING UNIT

The invention claimed is:

1. A communication device comprising:
a transceiver; and
processing circuitry configured to:
perform error correction coding processing on combined data that is obtained by combining first data and second data to be used as an input for the error correction coding processing so as to generate redundant data that comprises a parity code sequence,
wherein the error correction coding processing on the combined data comprises:
generating a first bit of the parity code sequence based on two bits of the first data and one bit of the second data, and
generating a second bit of the parity code sequence based on one bit of the first data, different from the two bits of the first data, and the one bit of the second data;
generate a transmission signal based only on the second data and the redundant data; and
transmit the transmission signal to another communication device.

2. The communication device according to claim 1, wherein the first data is data to be transmitted to the another communication device.

3. The communication device according to claim 2, wherein the first data to be transmitted to the another communication device is data to be transmitted to the another communication device before the second data is data to be transmitted in the transmission signal.

4. The communication device according to claim 2, wherein the first data to be transmitted to the another communication device is data to be transmitted to the another communication device after the second data is transmitted in the transmission signal.

5. The communication device according to claim 2, wherein
the first data is data to be transmitted on a control channel, and
the second data is data to be transmitted on a data channel.

6. The communication device according to claim 2, wherein the first data is data to be transmitted differently from the second data in at least one of a subcarrier interval, a transmission interval, or the error correction coding processing.

7. The communication device according to claim 2,
wherein the first data and the second data comprise at least one block of data that is obtained by dividing data to be transmitted into a plurality of code blocks, and
wherein the first data and the second data are separately transmitted.

8. The communication device according to claim 2, wherein the first data is data to be transmitted through a communication path different from a communication path of the second data.

9. The communication device according to claim 1, wherein the first data is known data.

10. The communication device according to claim 1, wherein the first data is calculated based on a predetermined calculation formula.

11. The communication device according to claim 1, wherein the first data includes a plurality of pieces of divided data.

12. The communication device according to claim 1, wherein the processing circuitry performs the error correction coding processing on the combined data in a case of transmitting the second data on a predetermined channel, and performs an error correction coding processing only on the second data in a case of transmitting the second data on a channel other than the predetermined channel.

13. The communication device according to claim 1, wherein the processing circuitry performs the error correction coding processing on the combined data in a case of transmitting the second data with a predetermined service quality, and performs an error correction coding processing only on the second data in a case of transmitting the second data with a service quality other than the predetermined service quality.

14. The communication device according to claim 1, wherein the processing circuitry performs the error correction coding processing on the combined data in a case of transmitting the second data from a predetermined antenna port, and performs an error correction coding processing only on the second data in a case of transmitting the second data from an antenna port other than the predetermined antenna port.

15. A communication method performed by a communication device and comprising:
performing error correction coding processing on combined data that is obtained by combining first data and second data to be used for the error correction coding processing so as to generate redundant data that comprises a parity code sequence,
wherein the error correction coding processing on the combined data comprises:
generating a first bit of the parity code sequence based on two bits of the first data and one bit of the second data, and
generating a second bit of the parity code sequence based on one bit of the first data, different from the two bits of the first data, and the one bit of the second data;
generating a transmission signal based only on the second data and the redundant data; and
transmitting the transmission signal to another communication device.

* * * * *